(12) United States Patent
Moss

(10) Patent No.: US 6,712,381 B1
(45) Date of Patent: Mar. 30, 2004

(54) PIVOTING, UNDERSLUNG, STOWAWAY, HITCH MOUNT

(75) Inventor: Newell Ryan Moss, Mapleton, UT (US)

(73) Assignee: Wing Enterprises, Inc., Springville, UT (US)

(*) Notice: Subject to any disclaimer, the term of this patent is extended or adjusted under 35 U.S.C. 154(b) by 0 days.

(21) Appl. No.: 09/699,279

(22) Filed: Oct. 26, 2000

Related U.S. Application Data

(63) Continuation-in-part of application No. 09/559,603, filed on Apr. 27, 2000.
(60) Provisional application No. 60/162,259, filed on Oct. 29, 1999, provisional application No. 60/204,365, filed on May 15, 2000, and provisional application No. 60/230,385, filed on Sep. 6, 2000.

(51) Int. Cl.$^7$ ................................................ B60D 1/54
(52) U.S. Cl. ........................ 280/491.1; 280/490.1; 280/491.5; 280/492; 280/415.1; 280/416.1
(58) Field of Search ........................ 280/511, 512, 280/478.1, 479.2, 491.1, 491.2, 491.3, 494, 492, 416.1, 490.1, 491.5, 415.1; 224/518, 519, 520, 502, 506; 403/3, 4

(56) References Cited

U.S. PATENT DOCUMENTS

| | | | | |
|---|---|---|---|---|
| 2,221,278 A | | 11/1940 | Utterback | 280/492 |
| 2,547,299 A | * | 4/1951 | Williams | 280/491.3 |
| 2,604,331 A | | 7/1952 | Kingston | 280/491.3 |
| 2,823,930 A | | 2/1958 | Cooper | 280/491.3 |
| 2,849,243 A | | 8/1958 | Halverson | 280/491 |
| 2,872,213 A | * | 2/1959 | Hosford | 280/415.1 |
| 2,889,155 A | | 6/1959 | Sandage | |
| 3,117,805 A | | 1/1964 | Schoeffler | 280/491.3 |
| 3,630,546 A | * | 12/1971 | Church | 280/416.1 |
| 3,655,221 A | | 4/1972 | Warner | |
| 3,664,686 A | | 5/1972 | Anderson | |
| 3,717,362 A | * | 2/1973 | Johnson | 280/500 |
| 3,734,540 A | | 5/1973 | Thiermann | |
| 3,751,072 A | | 8/1973 | Williams | 280/491 B |
| 3,779,653 A | | 12/1973 | Charlton | |
| 3,801,134 A | * | 4/1974 | Dees | 280/415.1 |
| 3,891,238 A | | 6/1975 | Ehlert | 280/446 R |
| 3,963,266 A | | 6/1976 | Thelin | |
| 3,979,138 A | | 9/1976 | George et al. | 280/478 R |
| 4,022,490 A | * | 5/1977 | Rocksvold | 280/500 |
| 4,033,601 A | | 7/1977 | Lindahl et al. | |
| 4,232,877 A | | 11/1980 | Milton | 280/415 A |
| 4,248,450 A | * | 2/1981 | McWethy | 280/415 |
| 4,275,899 A | | 6/1981 | Humphrey | 280/491 B |

(List continued on next page.)

FOREIGN PATENT DOCUMENTS

| | | | | |
|---|---|---|---|---|
| BE | 715 681 A | | 10/1968 | |
| DE | 3639183 | * | 8/1987 | 280/416.1 |
| FR | 2227739 | * | 11/1974 | 280/491.3 |
| FR | 2450167 | * | 10/1980 | 280/491.3 |

Primary Examiner—Lesley D. Morris
Assistant Examiner—Daniel Yeagley
(74) Attorney, Agent, or Firm—TraskBritt

(57) ABSTRACT

An apparatus for mounting a hitch to a vehicle. The apparatus may include a base connected to the vehicle. A mount, having a fastening portion and a main portion, may also be included. The fastening portion may receive a plurality of hitches thereon. The main portion may pivotably engage the base to provide a pivoting motion of the mount with respect to the base between a stowed position and a towing position distinct from the stowed position. A pivot may connect the main portion to the fastening portion to provide rotation therebetween. The apparatus may also include a hitch system having a first ball hitch monolithically formed to have a shank. A second hitch may be monolithically formed to have an aperture therein. The aperture of the second ball hitch may be shaped to axially receive and engage the shank of the first ball hitch.

16 Claims, 20 Drawing Sheets

U.S. PATENT DOCUMENTS

| | | | | |
|---|---|---|---|---|
| 4,456,279 | A | 6/1984 | Dirck | 280/415 A |
| 4,482,167 | A | 11/1984 | Haugrud | 280/491 B |
| 4,492,386 | A | 1/1985 | Roberts | |
| 4,568,098 | A | 2/1986 | Landry, Jr. | |
| 4,610,457 | A | 9/1986 | Harmon | 280/204 |
| 4,697,818 | A | 10/1987 | Moore | 280/415 A |
| 4,711,461 | A | 12/1987 | Fromberg | 280/494 |
| 4,721,324 | A | 1/1988 | Blacklaw | |
| 4,758,015 | A | 7/1988 | Pixley | |
| 4,772,039 | A | 9/1988 | Cook | 280/415 A |
| 4,792,153 | A | 12/1988 | Galdes | 280/478 B |
| 4,807,899 | A | 2/1989 | Belcher | |
| 4,807,900 | A | 2/1989 | Tate | 280/491.3 |
| 4,844,498 | A | 7/1989 | Kerins et al. | |
| 4,938,496 | A | 7/1990 | Thomas et al. | 280/511 |
| 4,944,525 | A | 7/1990 | Landry | 280/479.3 |
| 4,951,957 | A | 8/1990 | Gullickson | 280/479.2 |
| 5,000,473 | A | 3/1991 | Johnson | 280/491.1 |
| 5,033,764 | A | 7/1991 | Blacklaw | |
| 5,088,754 | A * | 2/1992 | Skelton | 280/491.3 |
| 5,106,114 | A | 4/1992 | Haupt | |
| 5,135,247 | A * | 8/1992 | Alfaro et al. | 280/415.1 |
| 5,288,095 | A | 2/1994 | Swindall | 280/479.2 |
| 5,312,128 | A | 5/1994 | Blacklaw | |
| 5,322,313 | A * | 6/1994 | Schroeder | 280/416.1 |
| 5,322,315 | A | 6/1994 | Carsten | 280/479.2 |
| 5,332,250 | A | 7/1994 | Thorwall et al. | |
| 5,351,982 | A | 10/1994 | Walrath | 280/416.1 |
| 5,375,867 | A | 12/1994 | Kass et al. | |
| 5,413,366 | A | 5/1995 | Gibbons | |
| 5,465,991 | A | 11/1995 | Kass et al. | |
| 5,503,423 | A | 4/1996 | Roberts et al. | 280/491.3 |
| 5,560,630 | A | 10/1996 | Phares et al. | 280/416.1 |
| 5,580,088 | A | 12/1996 | Griffith | 280/479.2 |
| 5,725,229 | A | 3/1998 | McWethy | 280/416.1 |
| 5,727,805 | A | 3/1998 | La Roque | 280/478.1 |
| 5,741,022 | A | 4/1998 | Wass et al. | 280/507 |
| 5,806,872 | A * | 9/1998 | Szczypski | 280/479.2 |
| 5,839,744 | A | 11/1998 | Marks | |
| 5,857,693 | A | 1/1999 | Clark, Jr. | 280/415.1 |
| 5,860,669 | A | 1/1999 | Wass et al. | 280/416.1 |
| 5,871,222 | A | 2/1999 | Webb | 280/511 |
| 5,890,727 | A | 4/1999 | May | 280/416.1 |
| D409,124 | S | 5/1999 | Bank | |
| 5,906,387 | A | 5/1999 | Wallace | 280/491.3 |
| 5,915,714 | A * | 6/1999 | Bell et al. | 280/456.1 |
| 5,934,698 | A * | 8/1999 | Despain | 280/490.1 |
| 6,092,827 | A * | 7/2000 | Korpi et al. | 280/514 |
| 6,116,633 | A | 9/2000 | Pride | 280/511 |
| 6,139,043 | A | 10/2000 | Gries et al. | |
| 6,142,238 | A | 11/2000 | Holt et al. | |
| 6,149,181 | A | 11/2000 | Biederman | |
| 6,460,870 | B2 | 10/2002 | Moss | |

* cited by examiner

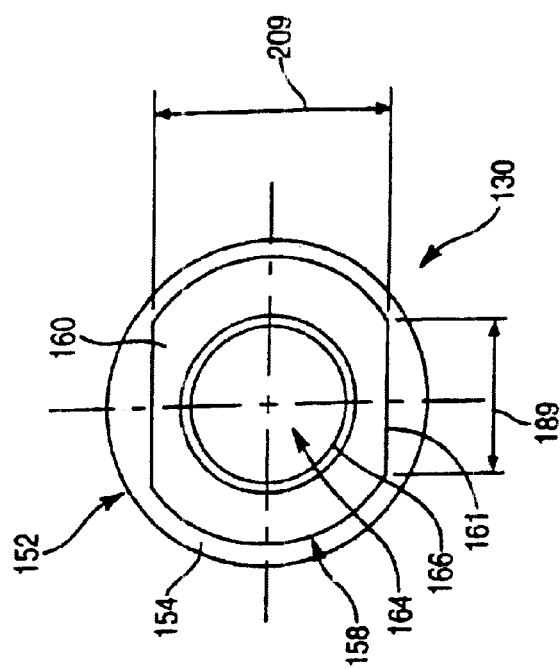
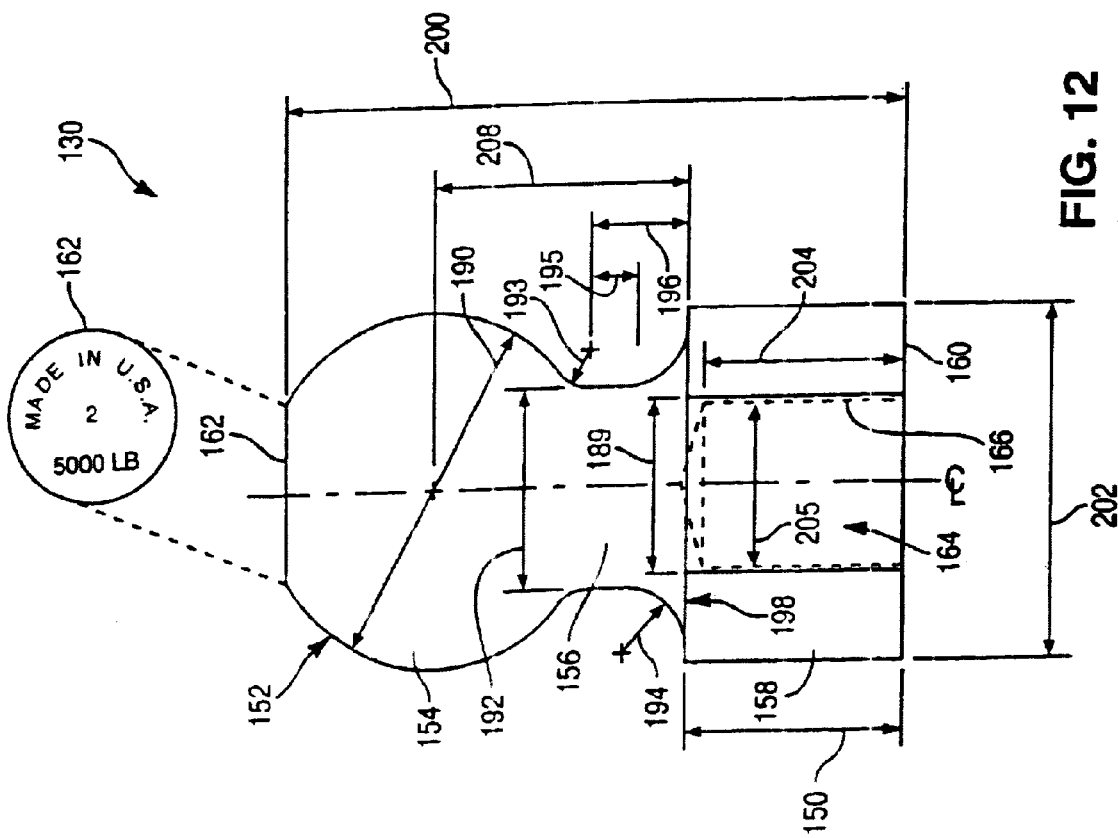

PIVOTING, UNDERSLUNG, STOWAWAY, HITCH MOUNT

CROSS-REFERENCE TO RELATED APPLICATIONS

This application claims the benefit of U.S. Provisional Application Ser. No. 60/162,259, filed Oct. 29, 1999 and entitled STOWAWAY RECEIVER HITCH, and is a continuation-in-part of my patent application Ser. No. 09/559,603, filed Apr. 27, 2000 and entitled STOWAWAY RECEIVER HITCH, now U.S. Pat. No. 6,460,870, issued Oct. 8, 2002, and claims the benefit of U.S. Provisional Application Ser. No. 60/204,365, filed May 15, 2000 and entitled BLIND-THREADED, PEDESTAL-BALL HITCH, and claims the benefit of U.S. Provisional Application Ser. No. 60/230,385, filed Sep. 6, 2000 and entitled PIVOTING, UNDERSLUNG, STOWAWAY, HITCH MOUNT. The foregoing applications are hereby incorporated herein by reference.

BACKGROUND

1. Field of the Invention

This invention relates to towing apparatus, and, more particularly, to novel systems and methods for securing trailers to towing vehicles with hitches.

2. State of the Art

Trailers have been towed since the earliest days of the wheel. A cart or wagon towed behind an animal is a trailer. In modern times, trailers are secured to towing vehicles by a multiplicity of methods, including frame-mounted hitches and bumper-mounted hitches. Tractor-trailer rigs use fifth-wheel towing systems. Similarly, recreational vehicles sometimes use fifth-wheel towing systems or often a receiver-type mounted ball hitch.

A receiver hitch relies on a receiver cavity or tube securely mounted to the frame of a towing vehicle. The receiver is reinforced and provided with an aperture for receiving a trunnion. A trunnion may be secured into the receiver. On the trunnion may be mounted a hitch. The hitch may be a pin hitch or ball hitch, typically, but need not be limited thereto.

For recreational users, receiver-type hitches present several common problems. The more important problem may be the difficulty of attaching a greasy hitch to a vehicle and disattaching the same after use. Although receiver-type hitches are generally adaptable to receive various trunnions with various types of hitches, the very nature of a receiver hitch may make it problematic. If a trunnion is not removed after use, then a person may accidentally strike a shin or knee on the extending hitch or trunnion when no towed vehicle is attached. If the hitch is removed, it is cumbersome to move, requires some immediate storage place, and may be filthy with grease. Due to the weight of the hitch and trunnion assembly, a person removing the trunnion and hitch from a receiver is likely to soil clothing.

Another problem with many types of hitches is the adjustment of altitude of the hitch itself. Recreational users may have multiple towed vehicles. For example, a boat trailer, a snowmobile trailer, a utility hauling trailer, and the like may be manufactured at different and arbitrary hitch heights. Similarly, a hitch may be used on different vehicles having different heights. Accordingly, it may be advantageous to provide a hitch mount that may be mounted on any convenient mount, yet be easily adjustable, storable, secure, and so forth.

Thus, it would be an advance in the art to provide a hitch mount that can be stowed without projecting inconveniently far from the bumper, substantially within the envelope of a vehicle, or even without extending behind the bumper on certain embodiments. Ready access, and substantially weightless or self-supporting deployment of a hitch is extremely desirable as are adjustable height, stowaway positioning, and continual connection.

Along with an adjustment in altitude, it is common to use different sizes of ball hitches. Accordingly, selective stowage and presentation, selectivity of multiple sizes of ball hitches on a single mount, without having to use a wrench to replace the ball hitch, alone or in combination would be a benefit and convenience.

A ball hitch may be formed to have an integral stud acting as a bolt for securing the ball to a mounting location. A lightweight ball hitch may be hollow to receive a bolt therethrough from the top, in an axial direction. However, any penetration into a ball hitch will necessarily affect the strength of the penetrated member. Moreover, a ball hitch must have a neck of substantially smaller diameter than that of the ball itself. The difference in diameters permits the capturing element on a trailer tongue to secure the ball therein, while still being able to rotate in all necessary degrees of freedom while under way.

Meanwhile, a ball hitch has a load rating associated with the overall strength of the ball hitch, including the ball, the neck, and the stud securing the ball hitch to a mount on a vehicle. The strength of the neck or the stud may limit the load rating of a ball hitch. Thus, the neck must be smaller than the ball, yet cannot be too small. Similarly, the stud must be sufficiently large in diameter to provide sufficient strength.

If a conventional ball hitch were to be drilled to receive a stud or bolt of a size corresponding to the stud of a conventional hitch of that same size, the neck would be so weakened as to render the ball hitch unfit for service. In attempting to maintain strength, a balance simply does not exist for balancing a load rating of a ball, a neck, and a bolt penetrating into the neck. Only by welding a ball onto a mounting surface has one been able to provide multiple ball hitches on a mount otherwise lacking space or other geometric considerations necessary to accommodate the two corresponding studs.

Thus it would be an advance in the art to provide a set of ball hitches having sufficient design freedom to effectively always have a balance of strength capacity in the ball, neck (shank), flange, and stud of one hitch to support it properly at the load rating typical of a ball hitch of corresponding diameter. It would be a substantial improvement also to provide another ball hitch, in such a set, having a penetration, threads, pedestal (extended shank, axially extended flange), neck, and ball configured to mount opposite and matingly engaged with the stud of the first ball.

One may desire that the sizes and ratings of two ball hitches to be used together be different, yet that each ball hitch be adequately supported, with the support of loading in all portions or regions thereof (neck, ball, stud, etc.) reasonably balanced. Accordingly, it would be an advance in the art to provide a method for designing a ball hitch, or a set of ball hitches that could accommodate the load and geometric considerations that both balls will need to function at full, rated load, and all expected conditions.

BRIEF SUMMARY AND OBJECTS OF THE INVENTION

In view of the foregoing, it is a primary object of the present invention to provide a ball hitch system such as may be suitable for a receiver-type or other mounting system. The hitch system should be supportable on a conventional or novel mounting.

It is an also an object of the invention to provide a hitch system that is easily height adjustable and theft resistant.

It is a further object of the invention to provide adjustment of the hitch in two degrees of freedom without the requirement of removing the hitch from the vehicle and with the use of no or relatively few tools.

It is an additional object of the invention to provide access to multiple levels of hitch height and multiple hitch sizes, such as ball diameters. It is a further object of the invention to provide an option to select among hitch heights, deployment and stowage options, and hitch sizes, without compromising the load capacity of any hitch option desired.

Consistent with the foregoing objects, and in accordance with the invention as embodied and broadly described herein, an apparatus is disclosed, in suitable detail to enable one of ordinary skill in the art to make and use the invention. In certain embodiments an apparatus in accordance with the present invention may include a mount, which may be secured to a vehicle to be movable between a stowed and a deployed position. The mount may include a platform for supporting a hitch, and may be pivotable about more than one axis to present multiple ball hitches or to compact the mount and base when stowed.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 12 is a side, elevation view of a pedestal-type ball hitch in accordance with the invention;

FIG. 13 is a bottom, plan view of the hitch of FIG. 12;

DETAILED DESCRIPTION OF THE PREFERRED EMBODIMENTS

It will be readily understood that the components of the present invention, as generally described and illustrated in the Figures herein, may be arranged and designed in a wide variety of different configurations. Thus, the following more detailed description of the embodiments of the system and method of the present invention, as represented in FIGS. 1 through 25, is not intended to limit the scope of the invention. The scope of the invention is as broad as claimed herein. The illustrations are merely representative of certain, presently preferred embodiments of the invention. Those presently preferred embodiments of the invention will be best understood by reference to the drawings, wherein like parts are designated by like numerals throughout.

Those of ordinary skill in the art will, of course, appreciate that various modifications to the details of the Figures may easily be made without departing from the essential characteristics of the invention. Thus, the following description of the Figures is intended only by way of example, and simply illustrates certain presently preferred embodiments consistent with the invention as claimed.

Figure 1:
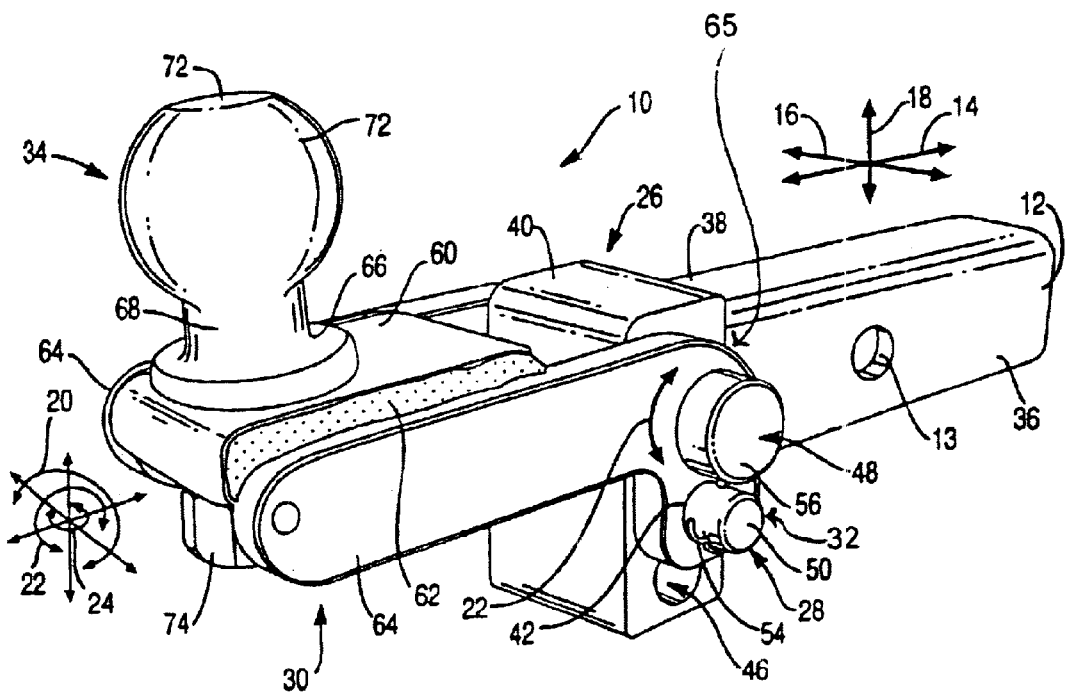
FIG. 1 is a rear quarter, perspective view (with respect to the front-to-rear orientation of a vehicle) of one embodiment of a receiver-type hitch-mounting mechanism, in a deployed position, in accordance with the invention.

Referring to FIG. 1, specifically, while also referring generally to FIGS. 1–25, an apparatus 10 or hitch mount 10 may be secured to a receiver or other suitable adapter of a towing vehicle. The apparatus 10 may include a trunnion 12 adapted to slidably fit within a receiver in a comparatively snug, supported, locked position. In general, a pin aperture 13 or simply an aperture 13 through the trunnion 12 may receive a pin (not shown) for locking the trunnion 12 with respect to a receiver (not shown).

The trunnion 12 of the apparatus 10 may define certain directions 14–24. The directions 14–24 may also define, or be defined by, a vehicle orientation. A longitudinal direction 14 extends in the direction that the trunnion 12 will typically be oriented. A lateral direction 16 is substantially orthogonal to the longitudinal direction 14. The longitudinal direction 14 and lateral direction 16 define a substantially horizontal plane with respect to a vehicle on a level surface. Of course, all directions 14–24 may be aligned with an arbitrary set of reference directions. Accordingly, horizontal and vertical have meaning only by way of example, and not by way of limitation.

A transverse direction 18 is substantially orthogonal to the longitudinal direction 14 and the lateral direction 16. The transverse direction 18 and the longitudinal direction 14 may form or define a first vertical plane. The lateral direction 16 and transverse direction 18 may together define a different vertical plane orthogonal to the first.

With respect to each of the directions 14, 16, 18, rotational directions 20, 22, 24, respectively, may be useful in describing the apparatus 10. A circumferential direction 20 may describe arcs formed with respect to an axis extending in the axis 14 or longitudinal direction 14. The circumferential direction 22 may describe arcs formed about the lateral axis 16 or direction 16. The circumferential direction 24 may describe arcs formed about the transverse axis 18 or direction 18. As will be clear from the circumferential directions 20, 22, 24, the directions 14, 16, 18 may alternatively be referred to as axes 14, 16, 18, respectively.

A trunnion 12 may have a portion thereof defined as a base 26. Alternatively, a base 26 may actually include a plate, bar, beam, or other structure for strengthening the trunnion 12. Also, the base 26 may provide a means for attaching a pivot 28 to the trunnion 12. The pivot 28 may be secured to the trunnion, may be independent therefrom, or may be a removable device 28. In one embodiment, the pivot 28 is a pin 28 received in and through the base 26.

A mount 30, secured by the pivot 28, is movable with respect to the base 26. Typically, the mount 30 pivots about the base 26, and about the pivot 28 in a circumferential direction 22, in the embodiment of FIG. 1.

For convenience, a pivot 28 may be left attached effectively permanently to the base 26. Likewise, the pivot 28 may secure permanently the mount 30 to the base 26. In one embodiment, the pivot 28 is removable, but may, as a practical matter, not need to be removed except perhaps to modify the mount 30.

By leaving the mount 30 secured by the pivot 28 to the base 26, a lock 32 may be easily engaged. The lock 32 may require alignment in a single direction, the circumferential direction 22 about a lateral direction 16. By promoting and including tolerances suitable for easy alignment, the apparatus 10 may have a lock 32 represented by a single shaft, or the like, to fix the mount 30 with respect to the base 26, and the pivot 28.

A principal function of the mount 30 is to support a hitch 34. The hitch 34 may be a ball-type hitch 34. The hitch 34 is desirably attached opposite the receiver end 36 of the trunnion 12, or vehicle end 36, at the load end 38 or operational end 38.

Figure 2:
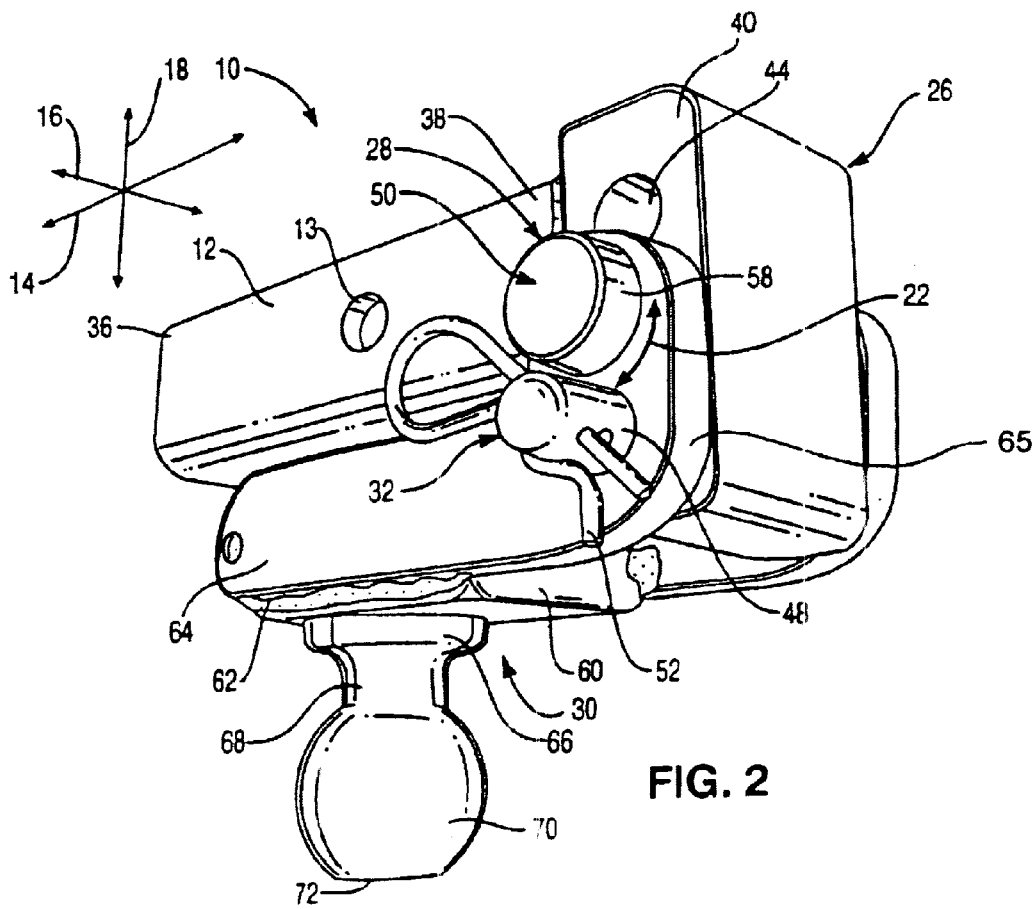
FIG. 2 is a lower, rear quarter, perspective view of the apparatus of FIG. 1, in a stowed position.

Referring to FIG. 2, while continuing to refer to FIG. 1, and more generally to FIGS. 1–25, a base 26 may be embodied in a block 40. The block 40 may be drilled, machined, or otherwise worked to provide an aperture 42 or pivot aperture 42 therethrough in a direction 14, 16, 18. In the illustrated embodiment, the aperture 42 extends in a lateral direction 16.

A deployment aperture 44 or aperture 44 may extend in a direction parallel to that of the pivot aperture 42 in order to receive a lock 32 for securing the mount 30 in a deployed position. In the embodiment of FIGS. 1–2 a stowage aperture 46 opposed to the deployment aperture 44 may receive a lock 32 or locking pin 48 therethrough to secure the mount 30 in a stowed position.

The lock 32 in certain embodiments may be little more than a pin 48, and the pivot 28 may likewise be a suitably sized and fabricated pin 50. The pins 48, 50 may be secured by a linchpin 52 or other type of keeper 54, respectively. A nut, locknut, key, pin, clip, or other securement mechanism may serve the function of the linchpin 52 or keeper 54 in securing the pins 48, 50.

In one embodiment, the pin 48 may have a head 56. The head 56 may be integrally formed with the pin, or may be welded thereto, threaded thereon, or the like. In one embodiment, the pin 48 may be a monolithic piece of steel of suitable strength and toughness, with the head 56 integrally formed thereon. Similarly, the pivot 28, embodied as a pin 50, may include a head 58. The heads 56, 58 preclude the pins 48, 50 from experiencing excessive motion in a lateral direction 16, in their corresponding apertures, 42, 44, 46.

A platform 60 may have an aperture (not shown) to act as a pin hitch point, or to receive a stud or bolt (not shown) securing the hitch 34 or ball hitch 34 to the platform 60. The platform 60 may be secured to the mount 30, or as part of the mount 30 by means of a fastener 62, such as the weld 62 illustrated.

In one embodiment, a principal portion of the mount 30 may be formed as a beam 64, or as a pair of beams 64. To accommodate the geometry of the trunnion 12, the pin aperture 13, and so forth, in operation, as well as the receiver (not shown) that will receive the trunnion 12, the beam 64 may have a corner 65. Thus, the beam 64 may angle between the base 26 and the platform 60 at some suitable orientation. In the embodiments illustrated in FIGS. 1–4, the beams 64 have corners 65 formed at right angles. By contrast, the beam 64 in the embodiment of FIGS. 5–6 may be formed at a different angle. The angle of the corner 65 may be formed according to good engineering practice, and to improve the functionality of the beam 64 in pivoting the mount 30 about the base 26, without interference with other portions of the apparatus 10.

The hitch 34 may be a conventional ball hitch 34. For example, the hitch 34 may have a base 66 formed to fit against the platform 60. Extending above the base 66 may be an integral or fabricated shank 68. The shank 68 in a forged hitch 34 is of the same homogeneous material as the ball 70. In other embodiments, worked metals, such as hot- or cold-worked steel may be combined in a fabrication to make a base 66, a shank 68, and a ball 70. Nevertheless, in one presently preferred embodiment, the base 66, and shank 68 extending therefrom, and the ball 70 may be formed as a single integral (monolithic), uniform piece.

Typically, a ball 70 may have a flat 72 to provide clearance with a hitch of a towed vehicle. Thus, the load bearing member is supported in all three directions 14, 16, 18 by the ball 70, itself. Accordingly, the ball also provides a pivot mechanism. Typically, a hitch 34 may be secured by a stud or bolt (not shown) mounted to the base 66 and secured by a nut 74 opposite the ball 70 through the platform 60. In certain embodiments, a safety loop may receive a bolt or chain as required by law in some states, or a locking pin for orientation during fabrication.

Figure 3:
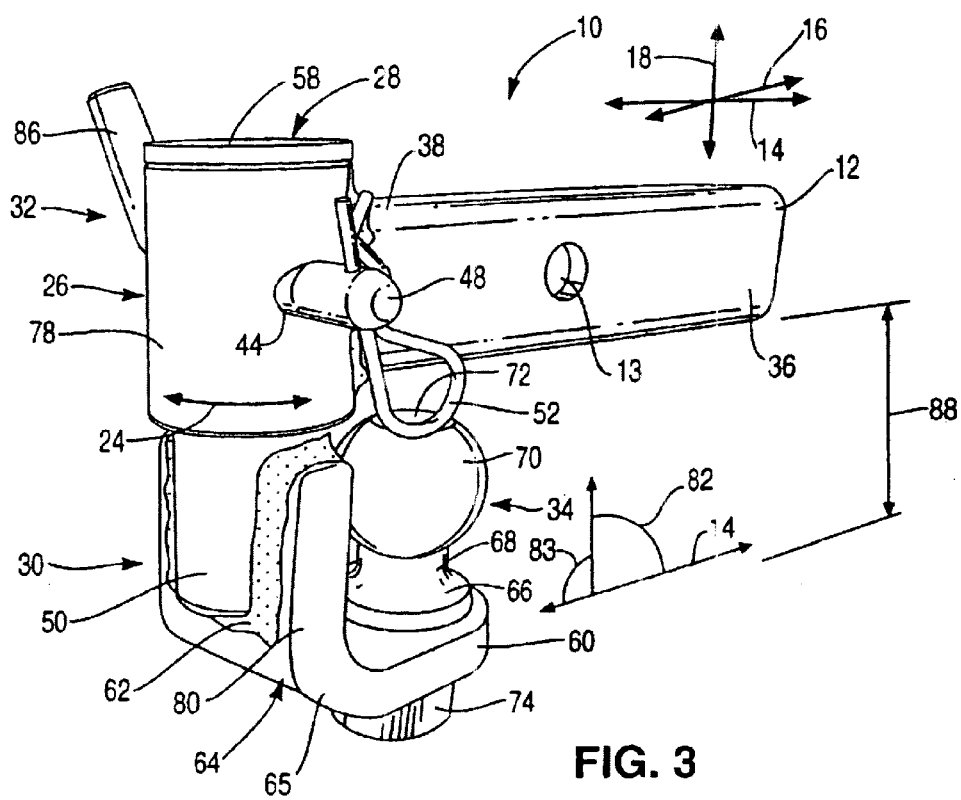
FIG. 3 is a rear quarter, perspective view of an alternative embodiment of an apparatus in accordance with the invention for implementing a hitch-mounting mechanism, in a stowed position.
Figure 4:
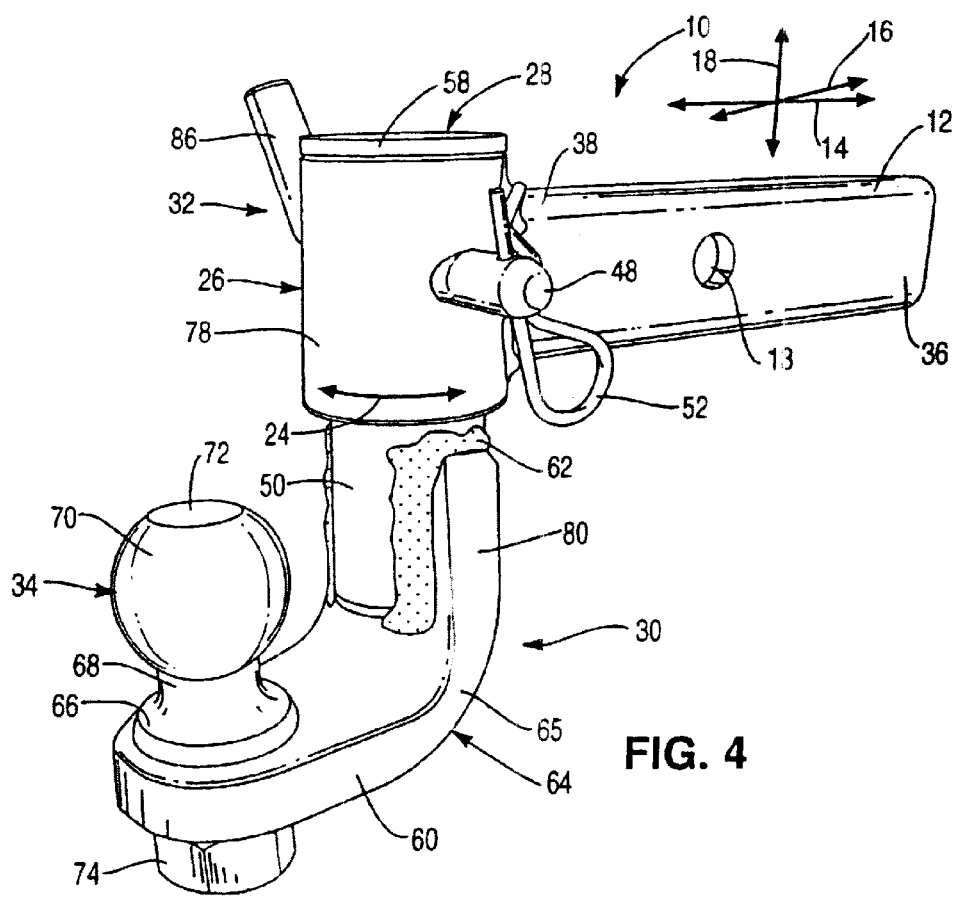
FIG. 4 is a rear quarter, perspective view of the apparatus of FIG. 3 in a deployed position.

Referring to FIGS. 3–4, while continuing to refer generally to FIGS. 1–25, the apparatus 10 may include a base 26 that is not rectangular. For example, the pivot 28 securing the mount 30 to the base 26 and trunnion 12, may itself be cylindrical. The mount 30 may have a lock 32 that uses or relies upon a single deployment aperture 44. For example, a stowage aperture 46, may actually be identical to the deployment aperture 44, but the orientation of the mount 30 about the pivot 28 changes between a deployed position (see FIG. 4) and a stowed position (see FIG. 3).

As illustrated, the hitch 34 may still be positioned selectively between a stowed position and a deployed position. The pivot 28, however, may rely on a pin 50 having more functions in certain alternative embodiments. For example, the pin 50 may support the loads in all directions 14–24. By contrast, the loading in the apparatus 10 of FIGS. 1–2 is somewhat more complex.

The concept of a linchpin 52 or keeper 54 may still be relied upon. Likewise, a head 58 on the pivot 28 (pivot pin 50 being a specific embodiment) may support a load in a transverse direction 18, rather than providing retainage in a lateral direction 16. Nevertheless, as a practical matter, the lock 32 may support loads in the transverse direction 18 depending upon the design of clearances between the head 58 and the cylinder 78 of the base 26. Likewise the clearance between the lock 32 and the aperture 44 through the cylinder 78, and the pin 50 may be significant.

The beam 64 may be monolithic, rather than multiple beams 64 of previously described embodiments. The beam 64 may include a corner 65 in order to orient the platform 60 suitably, while providing clearance for pivoting the hitch 34 between a stowed position (see FIG. 3) and a deployed position (see FIG. 4). The beam 64 may include a riser 80 or riser portion 80 angled at some interior angle 82 or exterior angle 83 with respect to the platform 60 (see FIG. 6).

For convenience, any of the pins 48, 50 may include a handle 86 for manipulation. When tolerances or clearances are tight, some rotation of a pin 48, 50 may be beneficial in order to remove or insert the pin 48, 50. One additional point concerning the head 58, of the pin 50 is that the head 58 may be either removable or integral. Since the locking pin 32 actually secures the position of the pivot 50, no great risk is presented by the head 58 being threaded or otherwise secured to the pin 50, rather than being secured monolithically. Thus, the pin 50 may be replaceable by one of different length (e.g. height) to provide a desired offset 88 in various embodiments of the apparatus 10 manufactured or sold.

Figure 5:
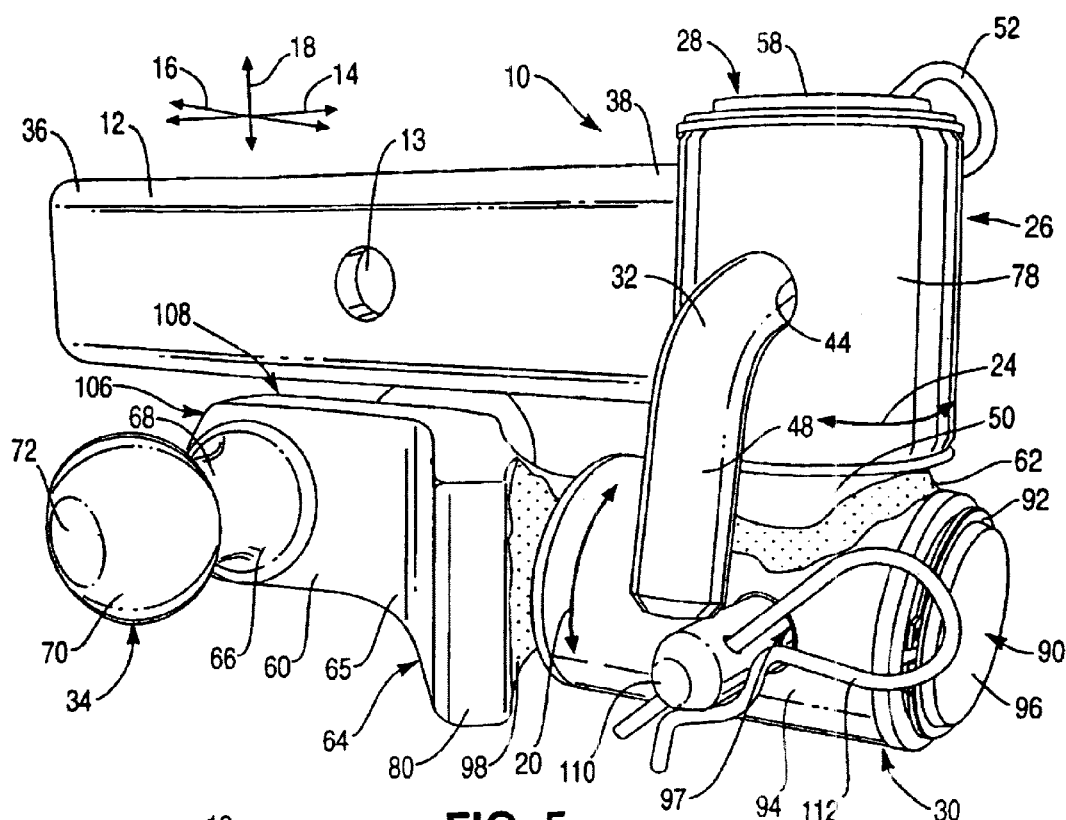
FIG. 5 is a rear quarter, perspective view of an alternative embodiment of a receiver-type hitch-mounting mechanism in accordance with the invention, in a stowed position.
Figure 6:
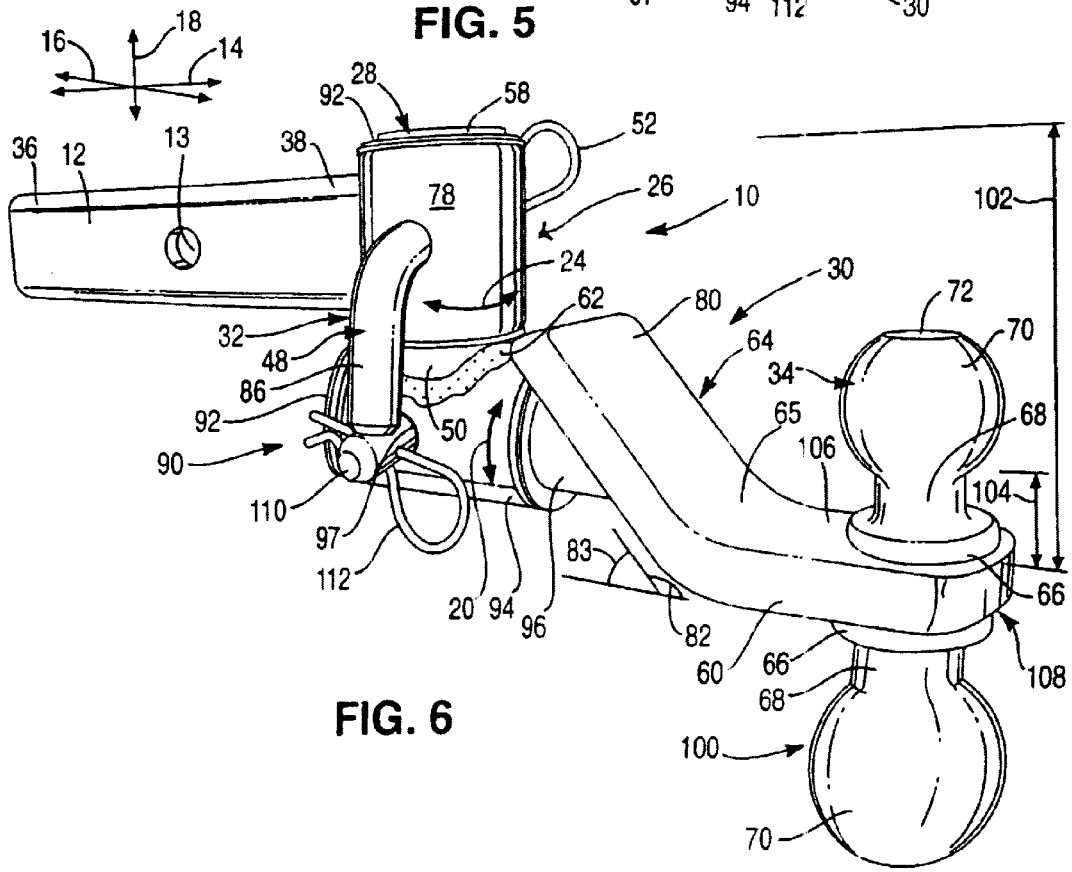
FIG. 6 is a rear quarter, perspective view of the apparatus of FIG. 5 in a deployed position.

Referring to FIGS. 5–6, while continuing to refer generally to FIGS. 1–25, an apparatus 10 having a trunnion 12 mounted to a base 26 securing a pivot 28 rotatable about a transverse axis 18 in a circumferential direction 24 may rely on a lock 32. The lock 32 may secure the pivot 28 between a stowed position (see FIG. 5) and a deployed position (see FIG. 6). In the illustrated embodiment, the pin 50 forms a principal element 50 of the pivot 28, in conjunction with the cylinder 78 forming the principal portion of the base 26, the mount 30 may include an additional or second pivot 90. In this embodiment, a more compact profile may position the hitch 34 higher, with respect to the trunnion 12 and base 28, providing more ground clearance between the mount 30, and the ground.

In this alternative embodiment, a fastener 62, such as a weld 62, may secure the pivot 90. The pivot 90 may include a housing 94 receiving a pin 96 therethrough to pivot. The pin 96 may be retained by a keeper 92 such as a lock ring 92, as illustrated, or the like. Again, the keeper 92 may secure the pin 96 against excessive movement, or escape from the housing 94. Nevertheless, during actual deployment, the security and load bearing to maintain the pin 96 in position are actually the responsibility of the second pin 110 kept in place by a linchpin 112 or other keeper 112. Bolts, pins, latches, and other fastening mechanisms may substitute for any of the locks 32. Nevertheless, as a practical matter, pins 48, 110 as well as the pivot pins 58, 96, may be fashioned in any manner suitable for efficient manufacture and function.

In one embodiment, the aperture 97 may extend through the housing 94, and the pin 96, at a single location. Nevertheless, in the embodiment of FIGS. 5–6, the aperture 97 may extend through the pin 96 along mutually orthogonal axis therethrough. Accordingly, the pin 96 may be rotated between a position of deployment with a first ball 70 up and useable, and a second deployed position with a second ball 100 up and useable.

In one embodiment, the pivot 28 may rotate the mount 30 to position the ball 70 directly under the trunnion 12 in a stowed position. In an alternative embodiment, the aperture 97, may actually comprise two apertures, positioned at angles substantially orthogonal to one another, through the pin 96. Thus, the mount 30 may be rotated at right angles along a longitudinal axis 14, and locked there by the pin 110. Thereafter, the mount 30 may be rotated about a transverse axis 18 of the pin 50, to position the mount 30 under the trunnion 12. Thus, the movement of the mount 30 between a deployed position and a stowed position may include two rotations or pivots and two locks 32, 110.

One may note that a height or offset 88 characterizing a distance between a platform 60 and a trunnion 12, may be selected in any embodiment of a hitch. However, in certain embodiments, an apparatus 10 in accordance with the invention may provide an offset 102 between the trunnion and the platform 60, or an offset 104 between some dimension or center of the pin 96 and the platform 60. Thus, the offset 104 may be reversed by rotation of the pin 96, placing the ball 100 in the upper position with the hitch 34 in the lower position. Thus, the offset 104 may actually be reversed by a rotation on the pin 96. If the ball 70 and the ball 100 are of different sizes, alternative hitches may be mounted on the same mount 30. If the balls 70, 100 are of identical size, the rotation of the pivot 96 may provide an elevation difference. Thus, both elevation and hitch size may be selectively varied by a user.

A mount 30 pivotably secured to a base 26 portion of a trunnion 12, may support a platform 60. The platform 60 may receive a bolt or stud for securing thereto a hitch 34, such as a ball 70, 100. In certain embodiments, a beam 64 may be formed as part of the mount 30, in order to provide both the pivoting function and the attachment to the base 26, simultaneously with attachment to the hitch. The apparatus may include one or more pins 48, 50, 96, 110 for pivoting the mount 30 with respect to the base 26, and portions of the mount 30 with respect to other portions of the mount 30, in order to selectively stow and deploy the hitch 34. In selected embodiments, additional pivots within the mount mechanism may provide virtually instantly adjustable height of the hitch, without a need for a user to separate load-bearing members of the apparatus 10 from one another. Likewise, a user need not support any substantial portion of the weight of the hitch system 10 in order to selectively deploy and stow, or to selectively position the hitch 34.

Figure 7:
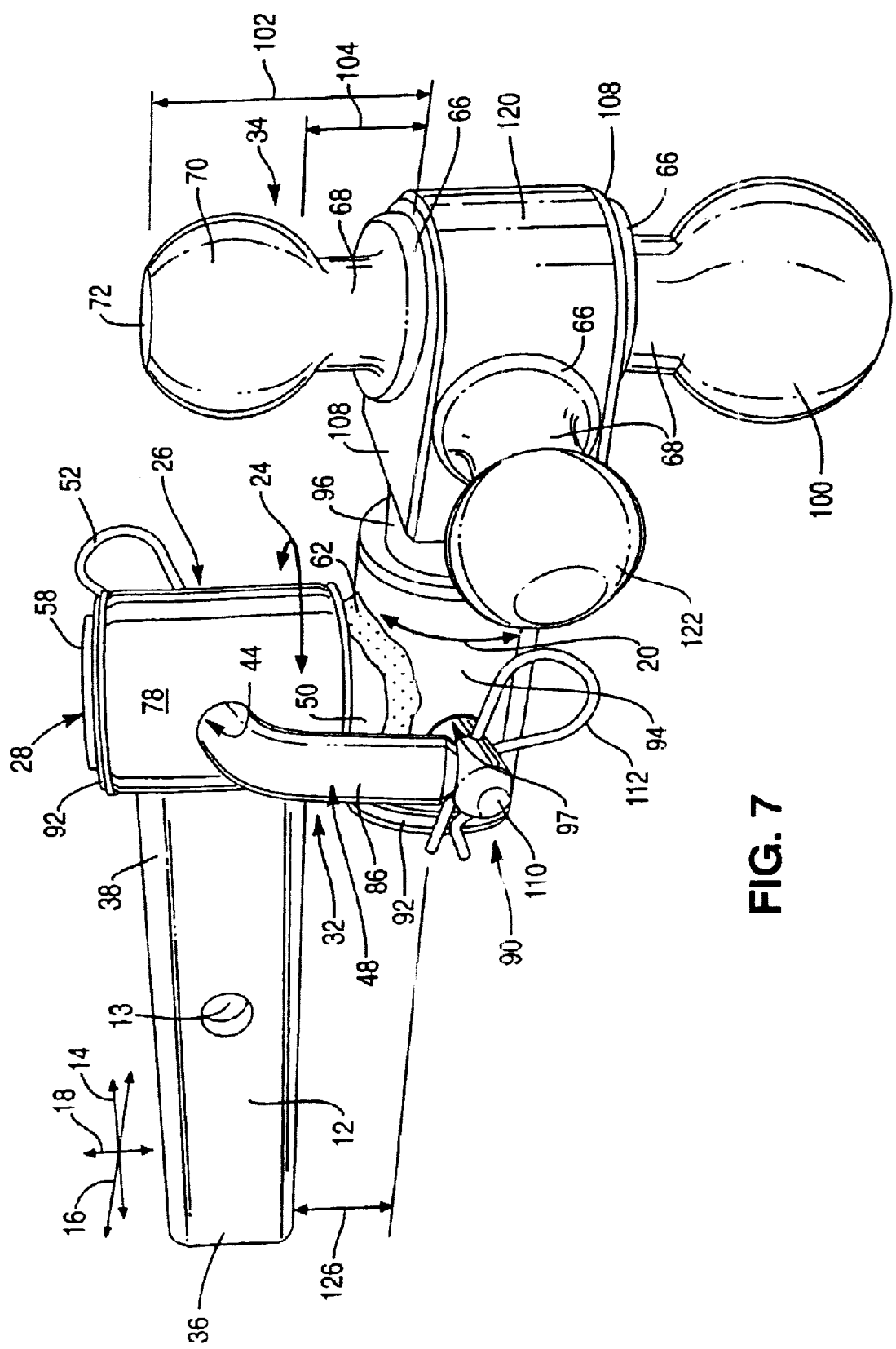
FIG. 7 is a rear quarter, perspective view of an alternative embodiment of a receiver-type hitch mounting mechanism, in accordance with the invention, in a deployed position.
Figure 8:
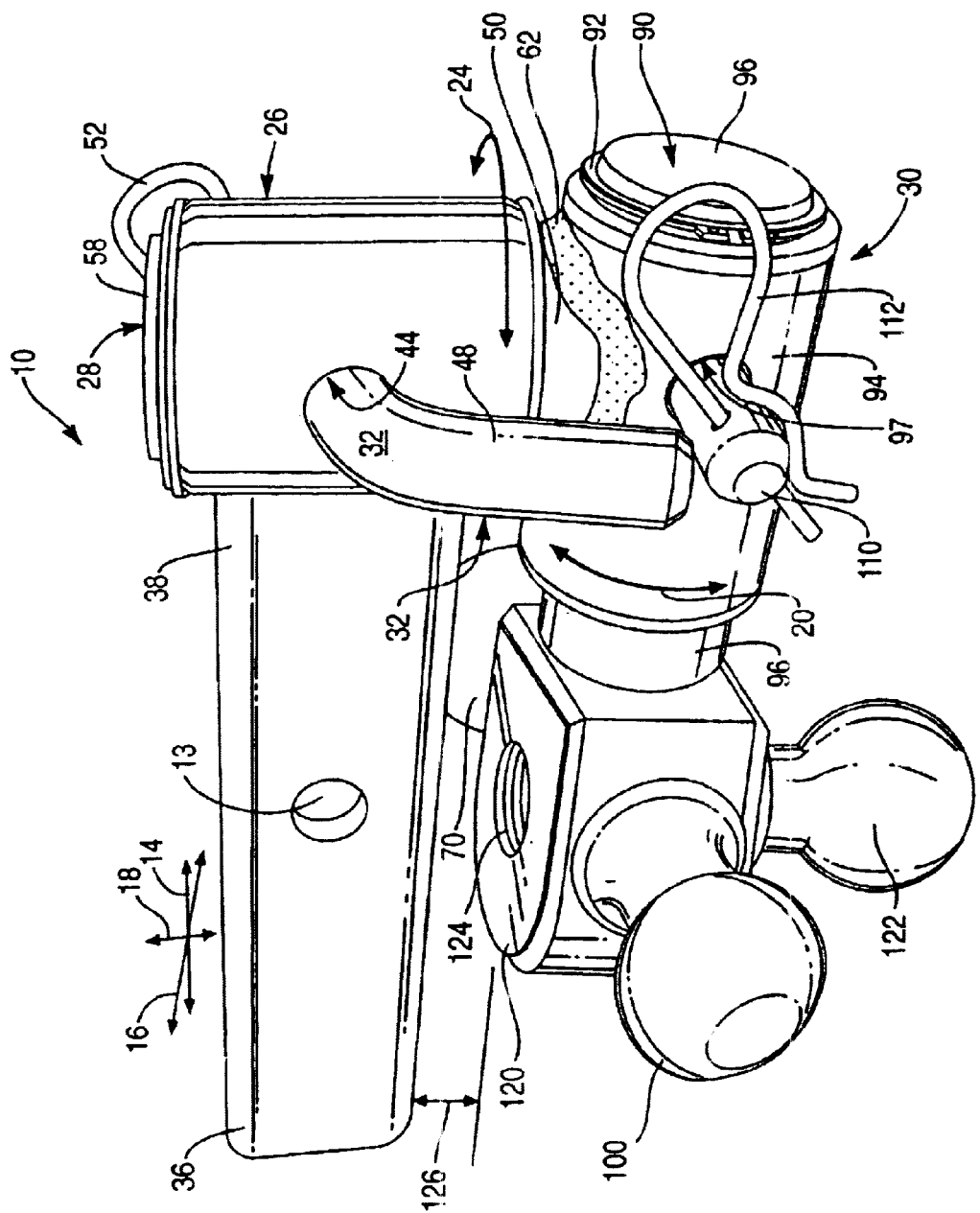
FIG. 8 is a rear quarter, perspective view of the apparatus of FIG. 7, in a stowed position.

Referring to FIGS. 7–8, while continuing to refer generally to FIGS. 1–25, an apparatus 10 having a trunnion 12 supports a pivot 28 rotatable about a transverse axis 18 in a circumferential direction 24. A lock 32 may secure the pivot 28 between a stowed position and a deployed position. The pin 50 or pivot 50 supports rotation with respect to the trunnion 12.

In this embodiment, a fastener 62, such as a weld 62, may secure a variety of a pivot 90 including a housing 94 with a pin 96 for locking. The pin 96 may be retained as discussed hereinbefore, against excessive movement or escape. Similarly, deployment security and load bearing rely on the second pin 110, secured by a linchpin 112 or other keeper 112. Again, bolts, pins, latches, and other fasteners may substitute.

The aperture 97 may extend through the housing 94, and the pin 96, at a single location. In the configuration illustrated, the pin 96 may rotate a mounting block 120 between several positions of deployment. For example, the block 120 may present a first ball 70 oriented to protrude up for use. Alternatively, a second deployment position may present a second ball 100. Similarly a third ball 122, or more, may secure to one or more apertures 124 in the block 120.

In one embodiment, the pivot 28 may rotate the block portion 120 of the mount 30 to position the hitches such as balls 70, 100, 120 directly under the trunnion 12 in a stowed position. The size and geometry of the pin 50 may be configured to provide a distance 126 or clearance 126 for accepting the block 120 with or without a ball therebetween.

The aperture 97, need only comprise two apertures 97, or one for each pair of positions (hitches) provided. Thus, the mount 30 may be rotated at right angles along a longitudinal axis 14, and locked there by the pin 110. Rotating about a transverse axis 18 of the pin 50 positions the mount 30 under the trunnion 12. As with the simpler version, movement between a deployed position and a plurality of stowed positions may be accomplished by only two rotations and two locks 32, 110.

In the embodiment of FIGS. 7–8, the block 120 need not be symmetrical. Thus, offsets 102, 104, or the like may be built into any dimension of the block 120 to provide various heights for balls 70, 100, 122. Balls 70, 100, 122 may be of different sizes, positioned at different heights, or both. That is, balls 70, 100, 122 of different sizes may be pivoted into position selectively. Alternatively, offsets 102, 104 may position balls 70, 100, 122 at different heights. Alternatively, certain of the balls 70, 100, 122 may be of identical size, others of different sizes, with all positionable by rotation of the pin 96 to provide the predetermined choice of ball 70, 100, 122 and height selected by a user.

Figure 9:
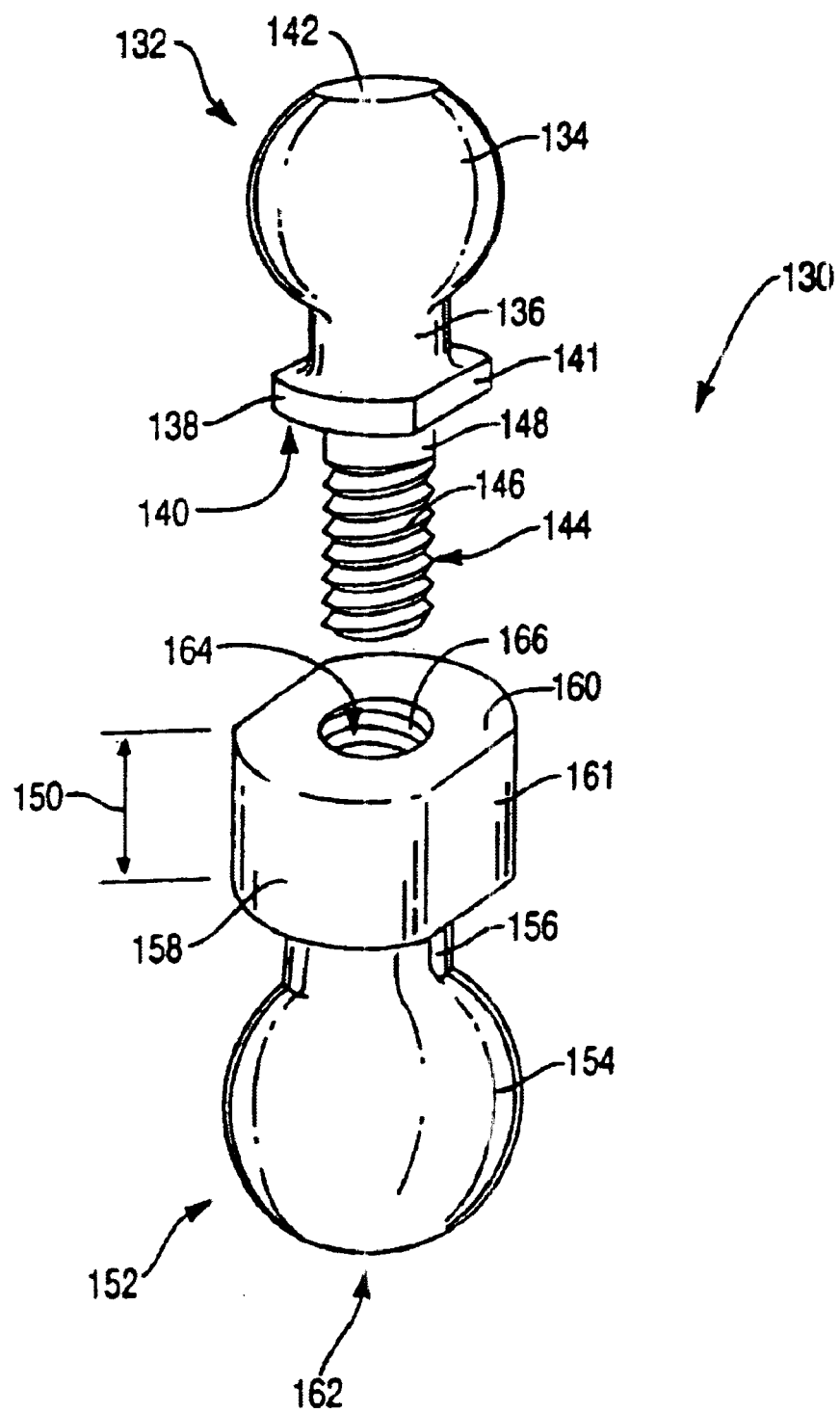
FIG. 9 is a rear perspective view of one embodiment of a blind-threaded, pedestal-ball hitch apparatus in accordance with the invention.
Figure 11:
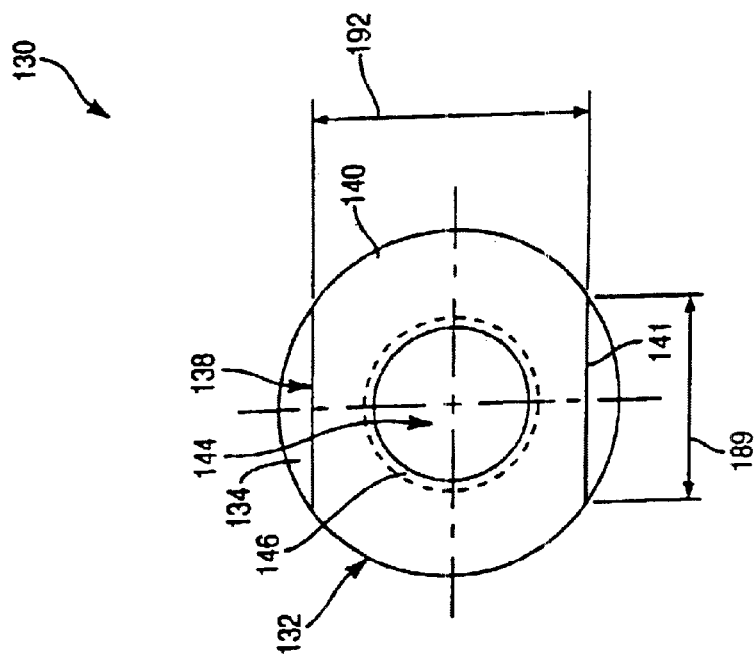
FIG. 11 is a bottom, plan view of the hitch of FIG. 10.
Figure 10:
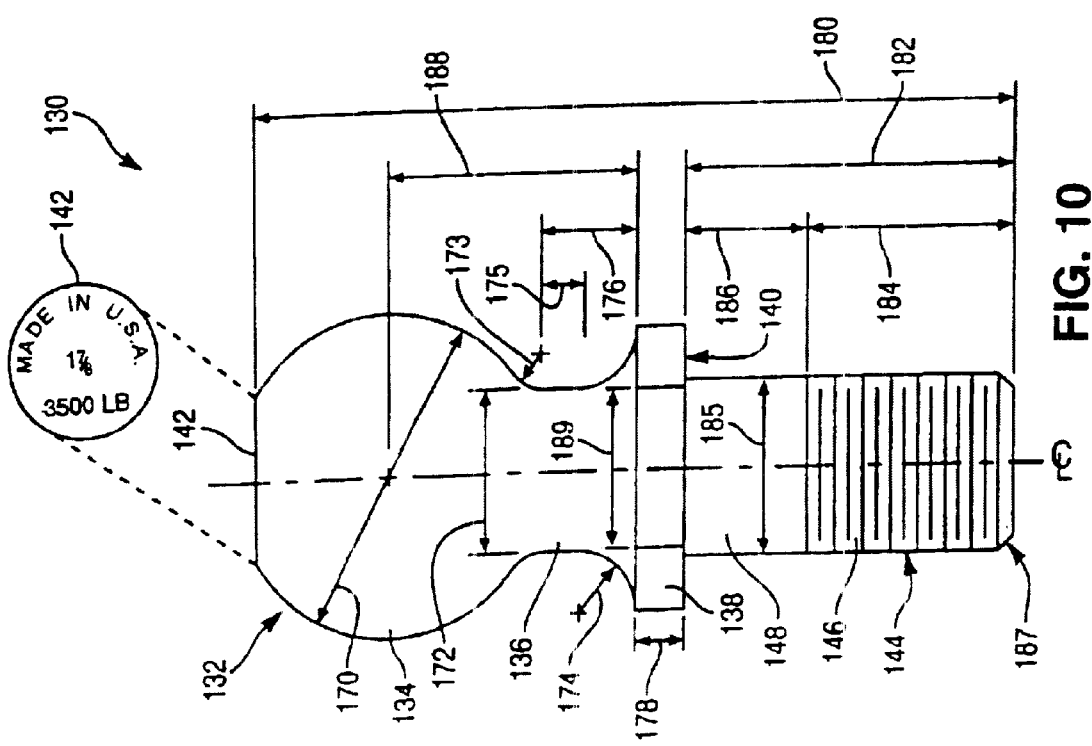
FIG. 10 is a side, elevation view of a ball hitch in accordance with the invention.

Referring to FIG. 9, a system 130 or apparatus 130 may include a first ball hitch 132, having a ball 134 forged with, or otherwise secured to, a neck 136. Opposite the ball 134 and connected to the neck 136 is a flange 138 or base 138. A flat shoulder 140 is formed on the flange 138 to orient and support the base 138 on a supporting surface.

Referring to FIG. 9, while also referring generally to FIGS. 9–25, a ball hitch 132 may include a flat 141 configured to receive a wrench for preventing turning of the ball hitch 132 during securement to a supporting surface. Also, a flat 142 on the ball 134 may provide space for a label identifying the load rating and other significant information about the ball hitch 132.

A stud 144 may typically be integrally formed with the ball 134, neck 136 (shank 136), and flange 138 or base 138. The stud 144 may secure the ball hitch 132 to a suitable platform 60 for towing. The stud 144 may have threads 146 on a shaft 148. In certain embodiments, the shaft 148 and neck 136 may be of approximately the same size in order to provide equal strength and to reduce stress concentrations that occur with substantial changes in cross section.

A pedestal height 150 in a second ball hitch 152 appears over-sized in contrast to the base 138. The base 138 acts primarily to register the ball hitch 132 and stud 144 with respect to a supporting mount, while also supporting a loading couple occasioned by radial loads on the ball 134. The ball hitch 152 includes a ball 154 secured, forged, or otherwise rendered integral with a neck 156 and pedestal 158. The ball 154, shank 156, and pedestal 158 are supported by a shoulder 160 adapted to fit against a mounting surface of a suitable mount (e.g. platform 60) for holding the first ball hitch 132 and second ball hitch 152 bolted together by the stud 144. The shoulder 160 supports axial and bending loading on the ball hitch 152.

A wrench flat 161 on the pedestal 158 is sized and shaped to receive a wrench for preventing rotation of the ball hitch 152 in a circumferential direction during installation or removal from a platform 60. Also, a flat 162 for a label may be imprinted with a load rating or other significant information associated with the ball hitch 152.

Unlike the flange 138, or base 138, of the ball hitch 132, the pedestal 158 does not have a stud 144 formed to receive a nut for securement to a mount. Instead, the pedestal 158 is formed to have a length 150 for receiving a substantial portion of the threads 146 of the stud 144. Accordingly, an aperture 164 having threads 166 matable to the threads 146 of the stud 144 acts as a nut to receive the stud 144.

The pedestal 158 is formed to have a cross-sectional area effective to support the stresses imposed by engagement of the threads 146, 166. The cross-sectional area of the pedestal 158 is sufficient to distribute stresses between the stud 144 and the neck 156, or shank 156, without radical changes in axial cross-sectional area. For example, the neck 156 cannot simply be bored to receive threads 166 directly. Such an undermining of the neck 156 severely restricts the load rating for which the ball 154 could be rated.

Instead, the continuity of material and stress distributions extends from the shank 136 through the shaft 148 and stud 144 to the pedestal 158 and neck 156. Thus, the ball hitch 132 and the hitch 152 may be supported at their full rated load, as if each were a single ball hitch having its own original rating in accordance with its size and conventional standard.

Referring to FIGS. 10–13, while continuing to refer generally to FIGS. 9–25, a diameter 170 of a ball 134 is sized to support a towing load on a shank 136. The ball 134 provides securement against removal of a trailer hitch from the ball 134. Accordingly, the diameter 170 of the ball 134 will exceed the diameter 172 of the shank 136 by a substantial difference selected to provide securement of a trailer hitch thereto. The diametral difference provides a full range of motion, for a trailer hitch second thereto, in all significant appropriate circumferential directions about the ball 134.

For stress distribution, a top radius 173 transitions between the neck 136 and the ball 134. Similarly, a bottom radius 174 transitions between the diameter 172 of the neck 136 and the base 138. The height 178 of the base 138 need primarily be sufficient to provide sufficient distribution of stress from the interface between the base 138 and the shaft 148, under the loading of the threads 146, along with resistance of any radial bending forces from the couple occasioned by radial loads applied to the ball 134.

A height 180 of the hitch 132 is taken by the ball 134, neck 136 and base 138 as well as a length 182 of the stud 144. In selected embodiments, a length 184 of threads 146 may be selected to accommodate an unthreaded portion of the shaft 148 at a full diameter 185 as much for providing a snug fit in a receiving aperture as providing a full support of an axial load thereon from the threads 146.

A length 186 of a bare portion of the shaft 148 should typically be sufficient to prevent combinations of stress risers (stress concentration factors) near the junction of the shaft 148 and the base 138. Thus, for manufacturing and performance reasons, the threads 146 should typically not extend to the base 138. A chamfer 187 at the end of the threads 146 provides easy piloting or starting for the stud 144.

A height 188 to the center of the ball 134 may be selected to provide sufficient distance in the straight rise 175 and overall neck rise 176 to accommodate clearance by a connected trailer hitch (not shown). A height 188 to the center of the ball 134, together with the diameter 172 of the neck 136 together determine the maximum stress on the outermost fiber of the neck 136 in response to radial loading on the ball 134 due to towing loads. A width 189 of a wrench flat 141, 161 may be selected in order to minimize any resulting increase in stress within the base, while still providing ready accommodation for a wrench of reasonable size.

In general, a second ball 154 having a diameter 190, may transition to a diameter 192 of a neck 156 selected for strength and for appropriate motion of a trailer hitch to be secured thereto. A top radius 193 may be selected to minimize any stress concentrations, while a bottom radius 194 may be suitably formed to minimize stress concentration factors as well as to transition to the pedestal 158. The neck 156 may pass through a rise 195 at a single diameter 192 between the top radius 193 and bottom radius 194. In selected embodiments, a diameter 192 of the neck 156 may be substantially the same as the diameter 185 of the shaft 148.

The significance of the aperture or bore 164 is dominated by the importance of the pedestal 158. A transition region 198 between the bulk of the pedestal 158, and the neck 156 provides support for bending loads imposed by radial forces acting on the ball 154. Likewise, any circumferential forces may be supported thereby. However, as a practical matter, the principal loading of the pedestal 158 and neck 156 will be due to bending stresses from radial loads forward and backward with respect to a vehicle, as a trailed vehicle (trailer) pushes and pulls during transport.

In one embodiment, the transition region 198 may be sized and shaped to minimize stresses associated therewith. Accordingly, the aperture or bore 164 may be sized occupy a minimum amount, or any reasonable amount, comparatively speaking, of the overall height 200 of the hitch 152. Meanwhile, the diameter of the pedestal 158 may be sized to accommodate sufficient material to support the neck 156 and transition region 198 while minimizing the stress concentrations or other effects imposed on the neck 156 and on the pedestal 158 by the material lacking in the aperture or bore 164.

The length 204 of the thread 166 may occupy the entire aperture or bore 164. However, the theory of thread failure to which the stud 144 and the aperture 164 are designed may govern the length 204 of threads 166. In the illustrated embodiment, the length 204 of the threads 166 may be equal to the length 204 of the aperture or bore 164. However, the aperture or bore 164 does not extend into the neck 156.

The diameter 205 of the aperture or bore 164 may be selected to accommodate the type of thread 166 chosen. Threads may be fine or coarse, comparatively, and the amount of material to be cut from a thread 166 will also affect the overall diameter 205 before and after threading. The height 208 of the center of the ball 154 may be governed by clearance considerations and loading required for the neck 156. Similarly, a width 209 by which the flats 161 are spaced will determine the size of wrench required to hold the pedestal 158 during installation on a supporting mount.

Figure 14:
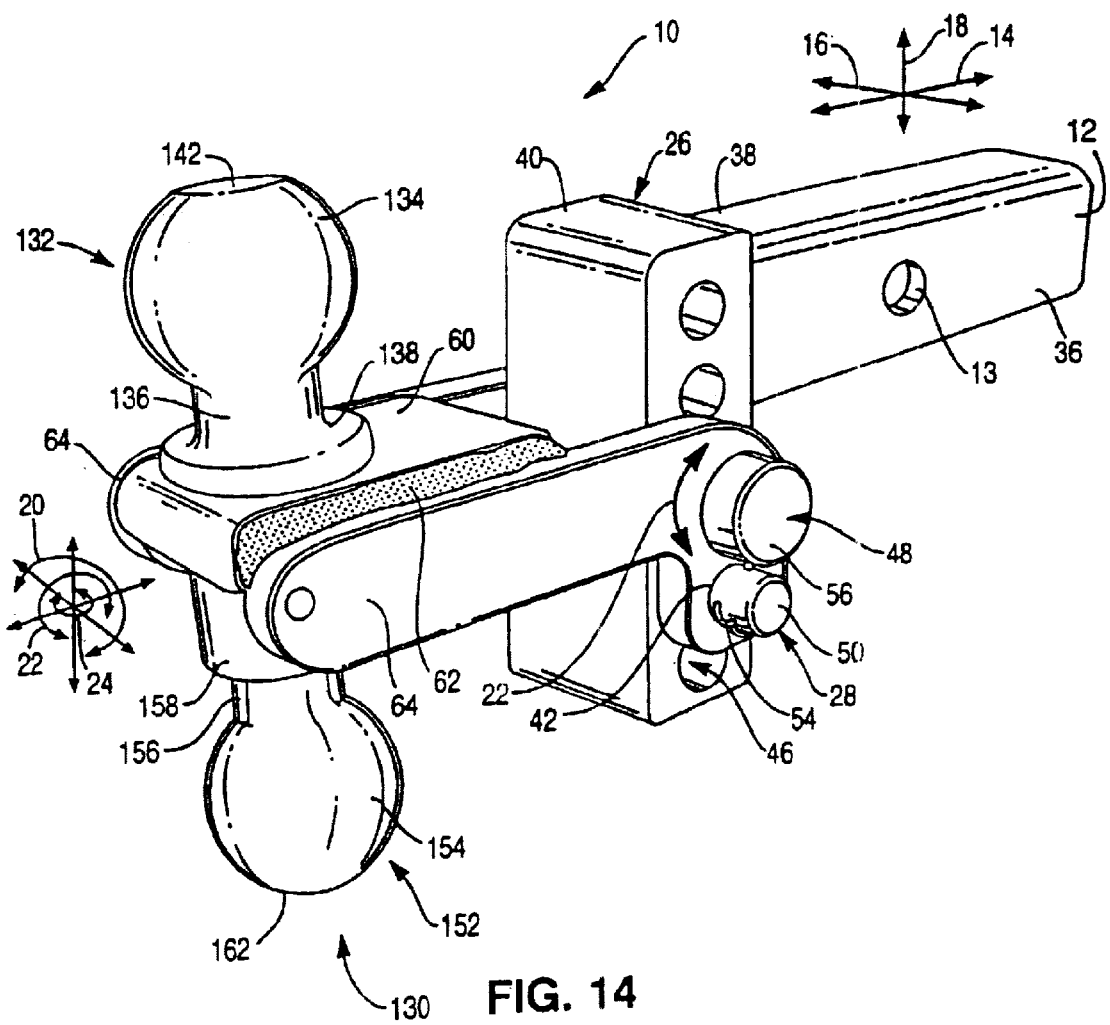
FIG. 14 is a rear-quarter perspective view of one embodiment of the apparatus of FIGS. 1–2, in combination with a ball hitch assembly in accordance with FIGS. 9–13.

Referring to FIG. 14, while continuing to refer generally to FIGS. 9–25, a ball hitch 132 may be fitted to a ball hitch 152 in accordance with a system 130 of the invention. Additional apertures 46 may accommodate the clearances required for the ball 154 or the ball 134 to clear the trunnion 12.

Figure 15:
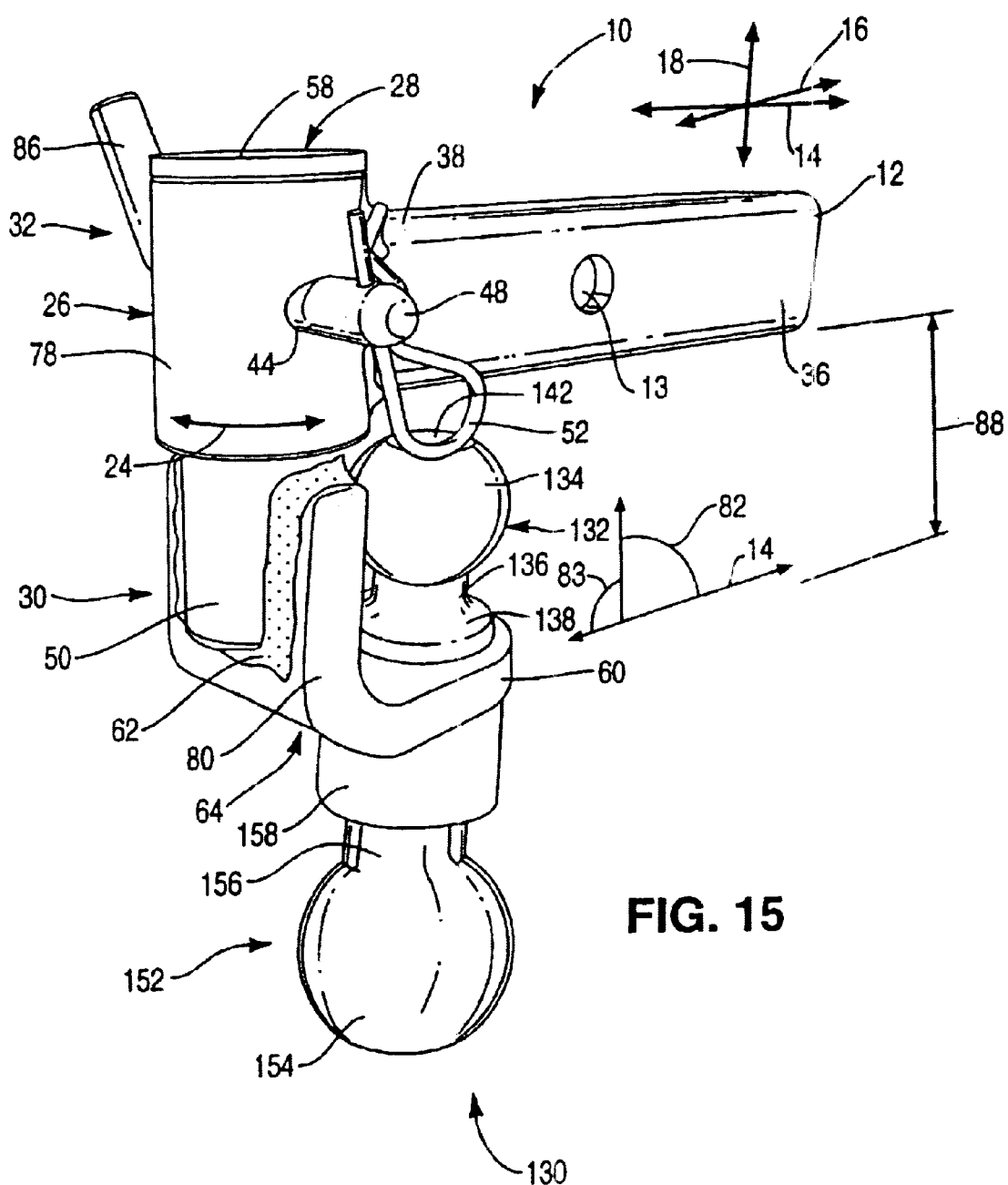
FIG. 15 is a rear perspective view of the apparatus of FIGS. 3–4, implementing one embodiment of a hitch apparatus in accordance with FIGS. 9–13.
Figure 16:
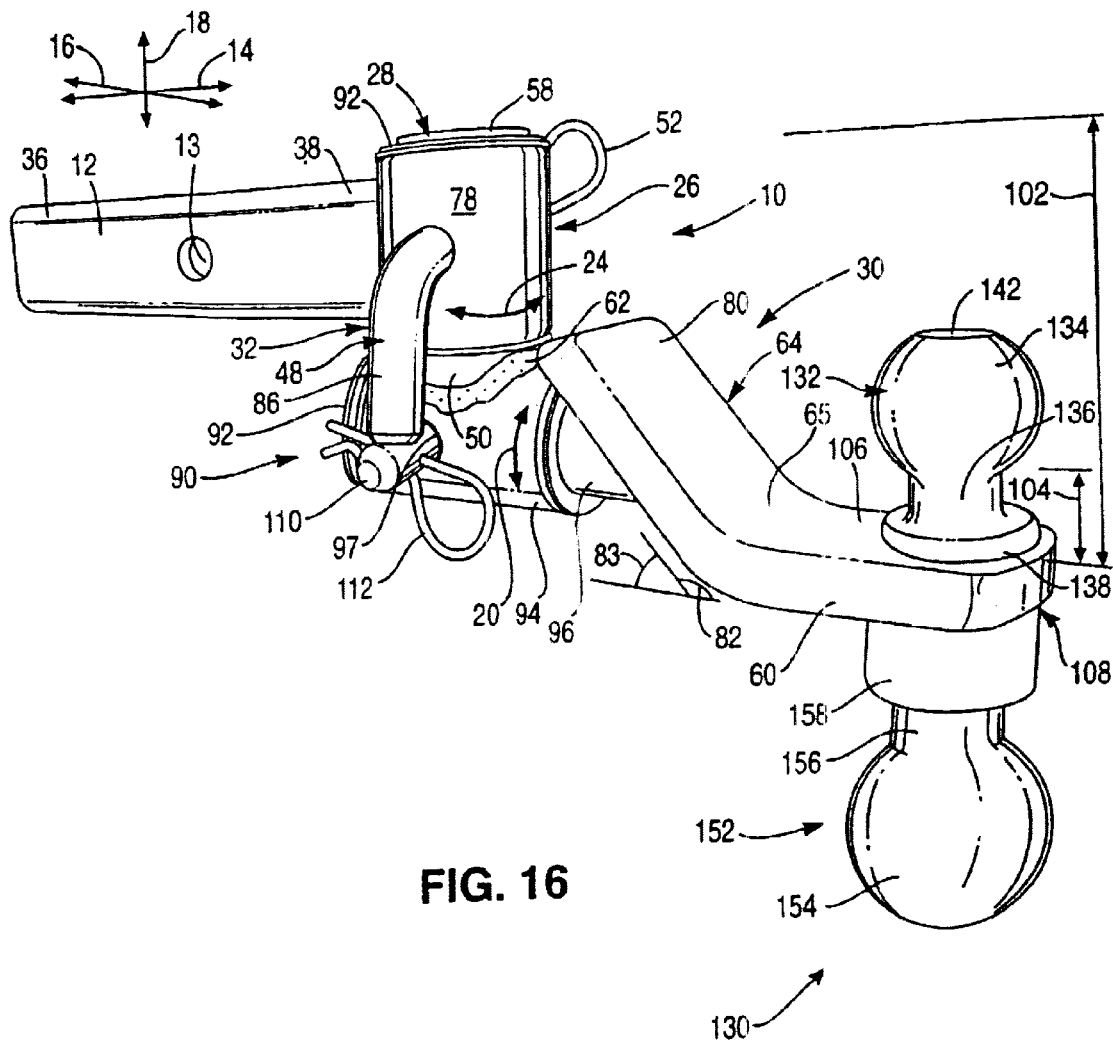
FIGS. 16–18 are perspective views of the apparatus of FIGS. 5–6 implementing various embodiments of the apparatus of FIGS. 9–12.
Figure 17:
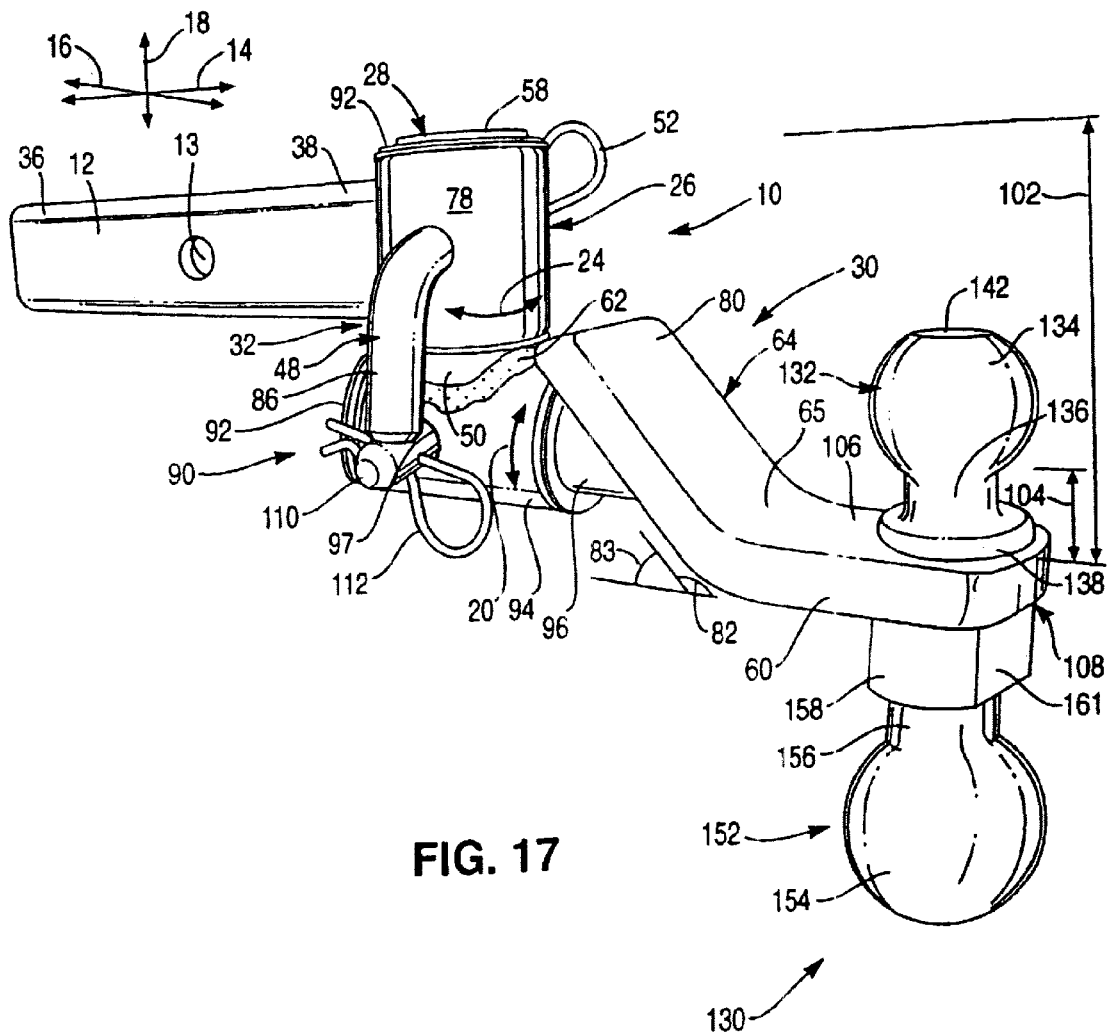
Figure 18:
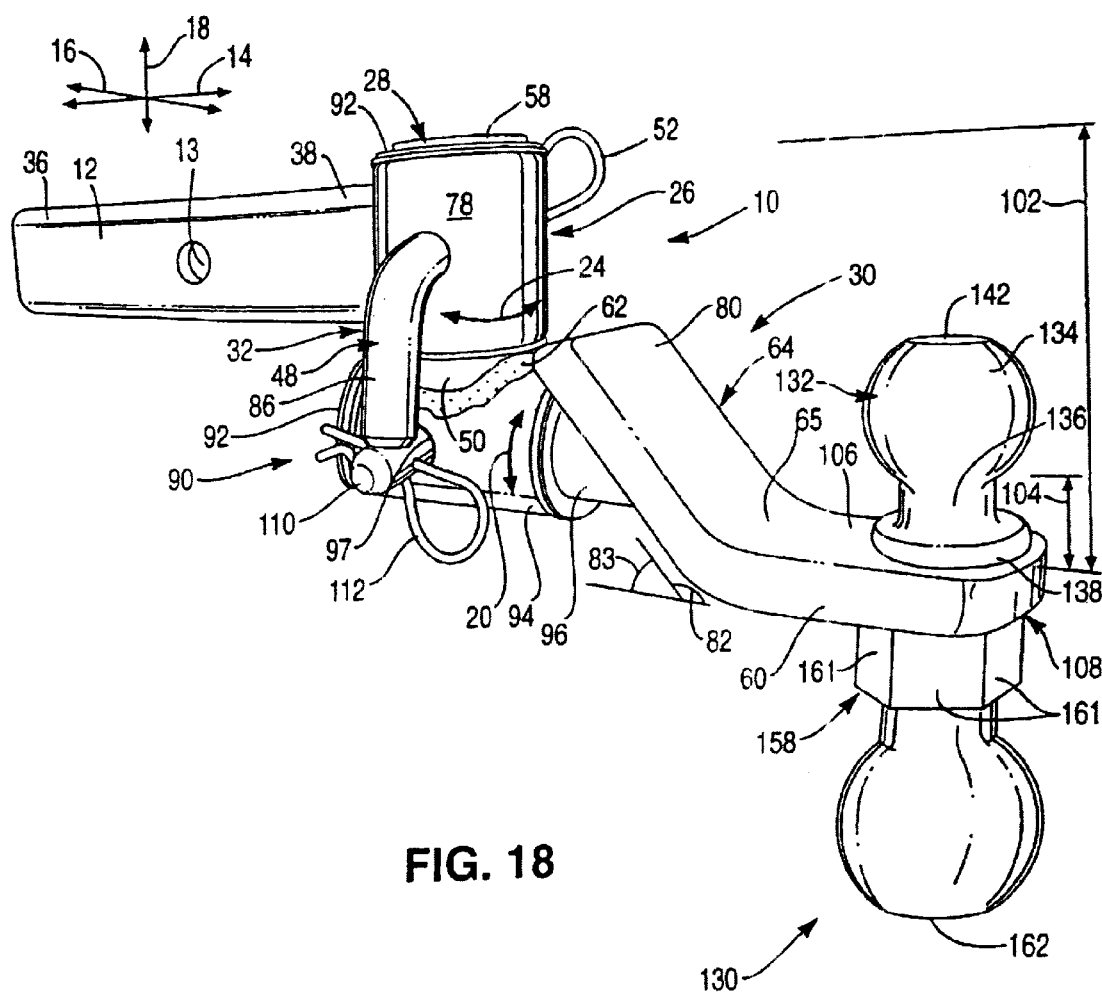

Referring to FIG. 15, the embodiment of FIGS. 3–4 can accommodate a ball hitch 132 and ball hitch 152 in accordance with the invention. The riser 80 may be selected to be of a size sufficient to provide the proper clearance with respect to the trunnion 12 and mount or platform 60. Referring to FIGS. 16–18, a system 130 containing a first ball hitch 132 and a second ball hitch 152, in accordance with the invention, may be secured in various manners. For example, the system 130 may be made without flats 161 on either ball hitch 132, 152.

Alternatively, as illustrated in FIG. 17, a pair of flats 161 may be formed on opposite sides of the pedestal 158, and on opposite sides of the base 138. In one embodiment, the entire pedestal 158 may actually be formed in the shape of a nut having multiple sets of opposed flats 161 for engaging a wrench. Also, the pedestal 158 may be located above or below any particular mount or platform 60. Thus, the overall height (e.g. from ground) of a particular ball 132, 152 may be affected by a combination of the rotation of the pin 96, as well as the positioning of the respective ball hitches 132, 152 on the mount or platform 60.

Figure 19:
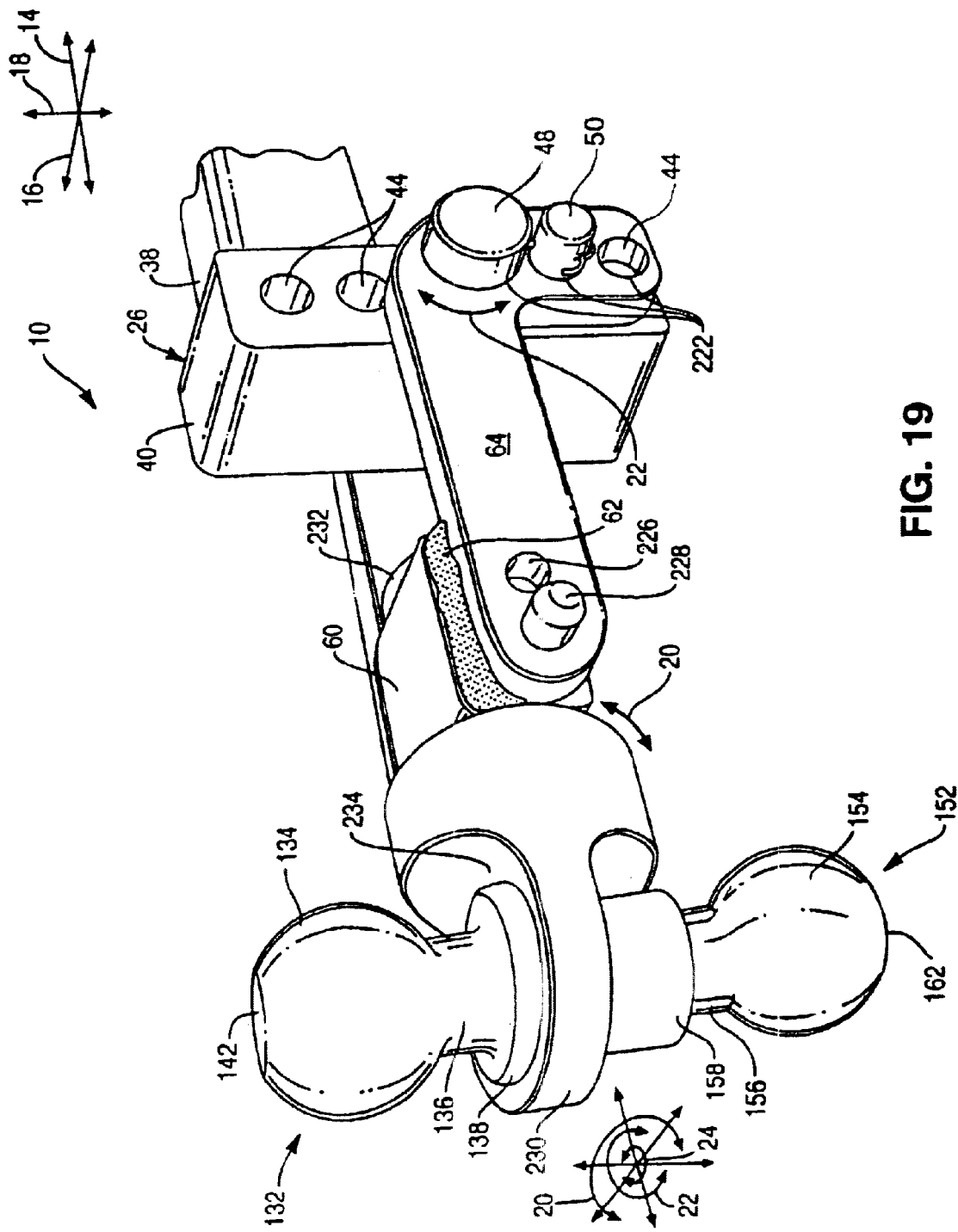
FIG. 19 is a perspective view of a deployed configuration of an alternative embodiment of an apparatus mounting a double-hitch assembly using two axes for pivoting.
Figure 20:
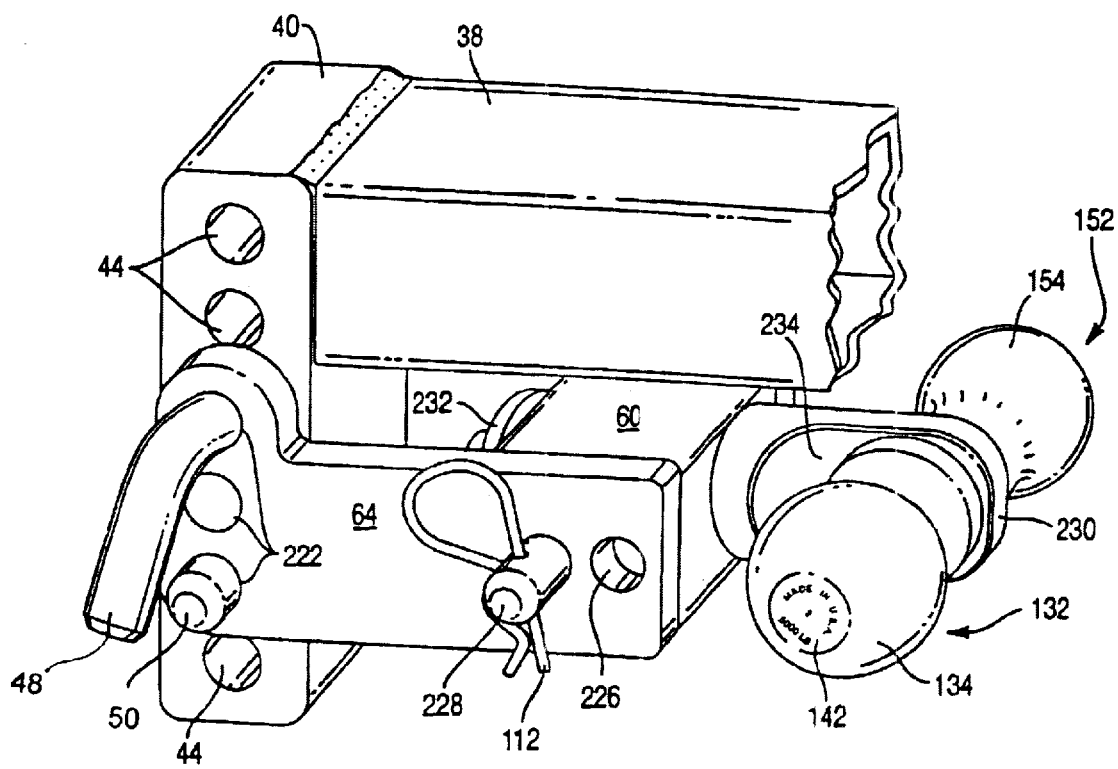
FIG. 20 is a perspective view of the apparatus of FIG. 19 in a stowed configuration.

Referring to FIGS. 19–20, while referring generally to FIGS. 19–25, one embodiment of a system for a hitch mount 10 in accordance with the invention may provide a much more compact stowed configuration when viewed with respect to the transverse axis 18, or in a transverse direction 18. In the illustrated embodiment, a block 40 may be perforated by several apertures 44. The apertures 44 are designed to receive locking pins 48. The beams 64 may take various positions, with various of the apertures 44 serving to receive locking pins 48. A single locking pin 48 extending through apertures 222 of the side beams 64 and apertures 44 of the base 26 may permit the mount 30 to pivot thereabout. The insertion of a second locking pin 48 through apertures 222 of the side beams 64 and apertures 44 of the base 26 may, then, fix the position of the mount 30 relative to the base 26. In certain embodiments, more than two apertures 222 in the beams 64 may provide additional options for pivoting, locking, and so forth.

In certain embodiments, the platform 60 may be rigid or rotatable within the beams 64. In one embodiment, the platform 60 may be rigidly secured by an appropriate fastener, such as by welding, to the beams 64, making an integral mount 30. The mount 30 pivots around a select one of the pins 48 between a deployed position (see FIG. 19), and a stowed position (see FIG. 20). Thus, the beam 64 may pivot between a deployed position and a stowed position.

Moreover, the beams 64 may have additional apertures 224, 226 for receiving a pin 228 configured to selectively lock a turntable 230. In the example of FIGS. 19–25, the turntable 230 is secured to rotate about a longitudinal axis 14 in a circumferential direction 20, supported by a pin 232 extending longitudinally 14 through the platform 60. A suitable system of linchpins 52, or other keepers 54 may secure the pins 232 in the platform 60.

As a result of the rotational degree of freedom added by the turntable 230, the ball hitches 132, 152 may be secured to rest against flats 234 formed in the turntable 230. The ball hitches 132, 152 may be secured by any suitable means, and may include a lock washer 236 for securement against unthreading due to vibration during travel.

Multiple apertures 266, 268 may not be necessary. However, in the illustrated embodiment, in order to improve the structural integrity of the pin 232, one aperture 266 serves to receive the pin 270 in a deployed position of the turntable 230, while a second aperture 226 serves to receive the pin 228 when the turntable 230 has been rotated to a stowable or stowed position. By maintaining multiple apertures 224, 226, which may be oriented in any suitable direction within the platform 60 (e.g. vertical, horizontal, etc.), the mass of the pin 232 is maintained, providing additional support for the towing load.

Figure 21:
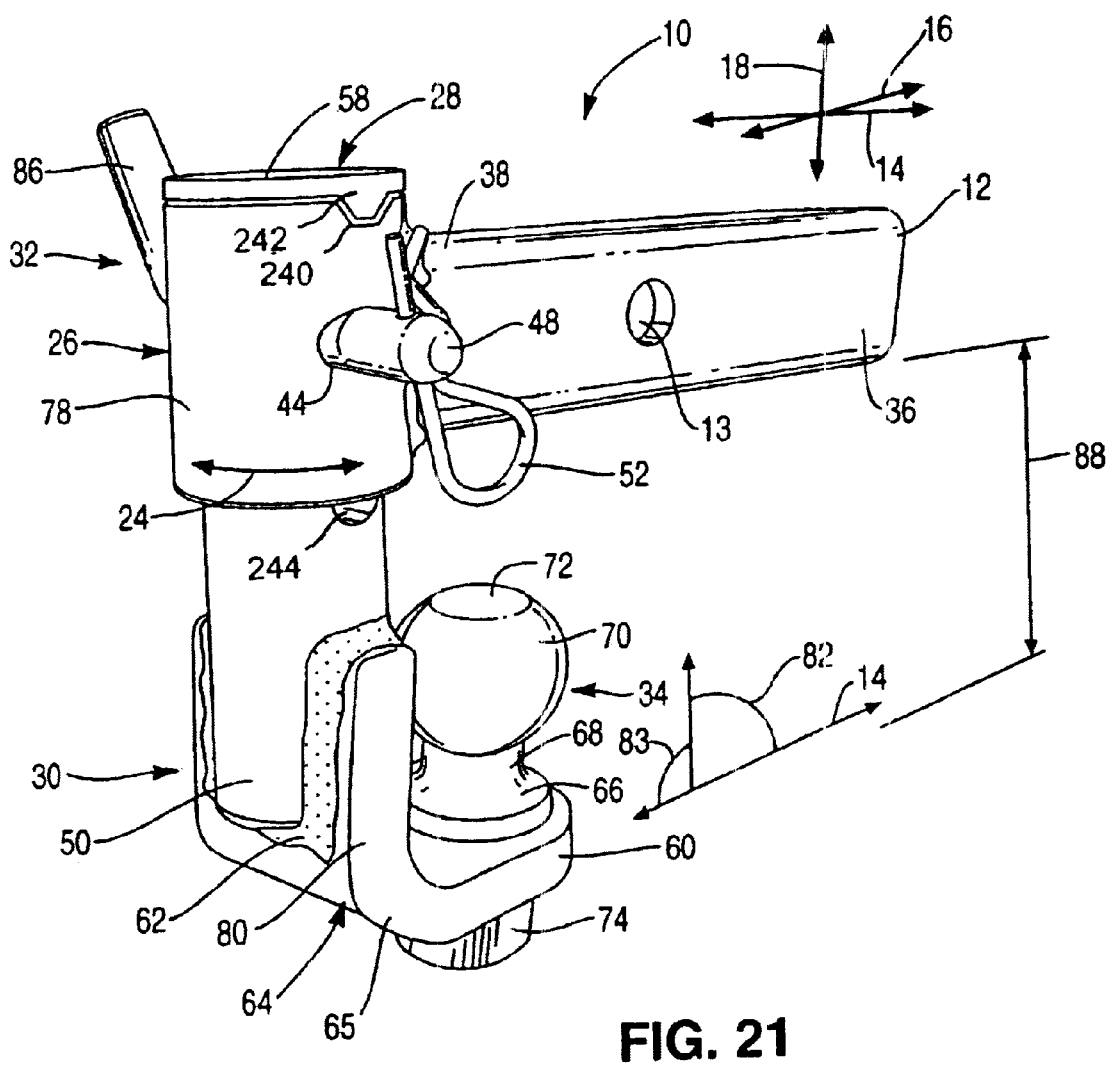
FIG. 21 is a rear quarter, perspective view of an alternative embodiment of the apparatus of FIGS. 5–6.
Figure 22:
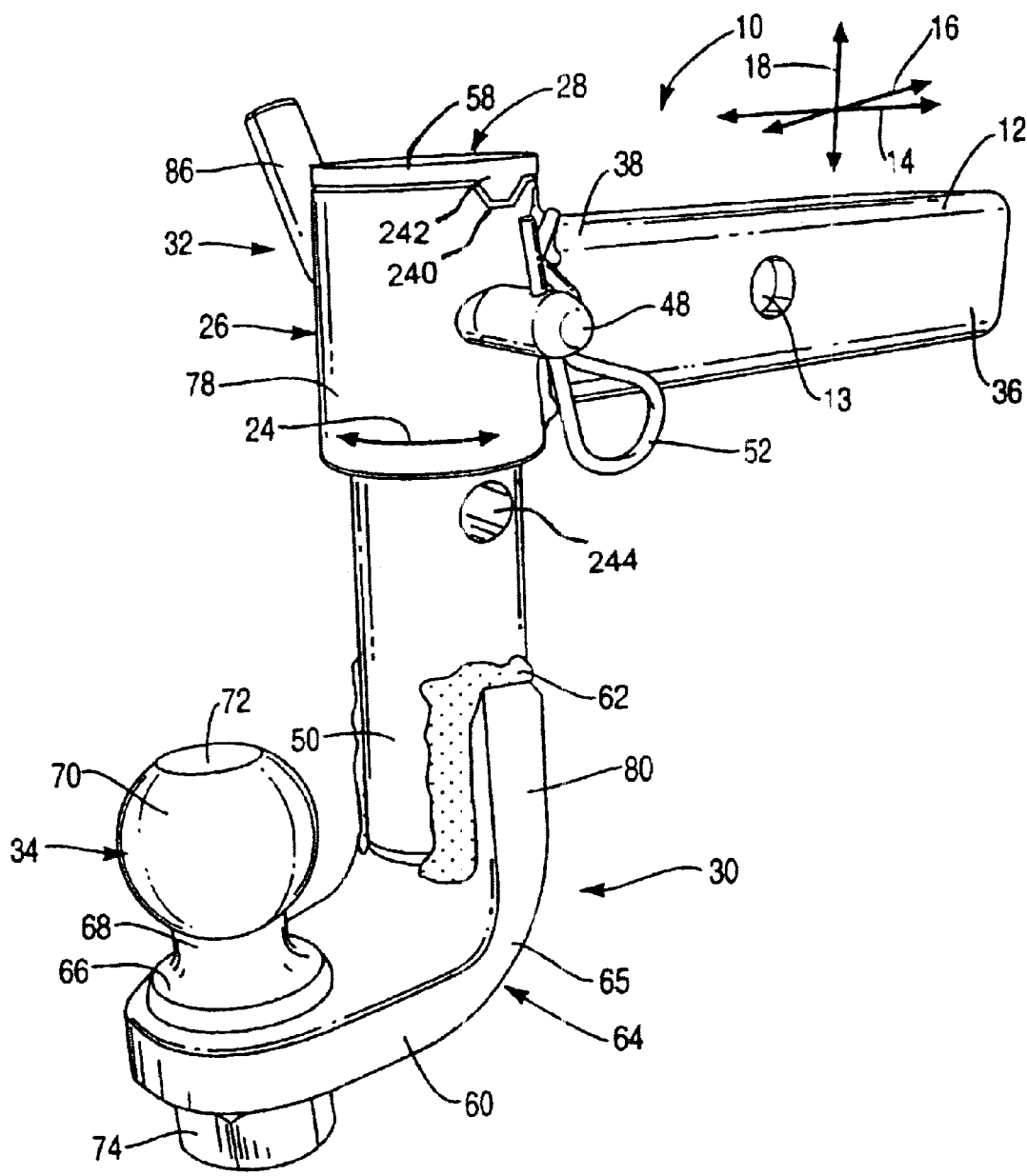
FIG. 22 is a rear quarter, perspective view of an alternative embodiment of the apparatus of FIG. 21, in a deployed position.

Referring to FIGS. 21–22, an embodiment similar to that of FIGS. 3–4 may include a detent 240, a longer shaft 50 or pin 50 about which the platform 60 pivots. The head 58 may be secured to support the hitch weight of a trailer. Thus, the pin 48 is not required in order to support the tongue weight during hitching and unhitching a trailer.

By removal of the pin 48 temporarily, the pin 50 or shaft 50 is free to rotate with respect to the cylinder 78. Thus, a comparatively small misalignment between the ball 70 and a hitch on a trailer tongue may be accommodated by swinging the platform 60 laterally 16. With the detents 240, on either the shaft 50 or the cylinder 78, and an appropriate recess 242 on the other, the pin or shaft 50 will be self registering at either the stowed position under the trunnion 12, or the deployed position behind the trunnion and towing vehicle frame.

Accordingly, whenever a user drives the towing vehicle forward, the longitudinal 14 pull of the trailer will draw the platform 60 and ball 70 toward the rear of the apparatus 10. Meanwhile, the trailer tongue weight will urge the ball 70 downward in a transverse direction 18. Upon registration of the detent 240 and recess 242, the tongue weight of the trailer will urge the detent 240 to engage the recess 242, positioning and fixing the platform 60 and ball 70, ready to be secured by the pin 48 through one of the apertures 244 at an appropriate, selected height.

Alternatively, a detent 240 may be provided in association with a cylinder 78 and pivot 28, of the system of FIGS. 5–6. Also, the turntable 230 of FIGS. 19–20 may be pivoted on the pivot shaft 96 (pin 96) of the apparatus 10 of FIGS. 5–6, providing several features in a different combination. Likewise, the housing 94 may be set at the lower end of a pin or shaft 50 in the apparatus of FIGS. 21–22.

Figure 23:
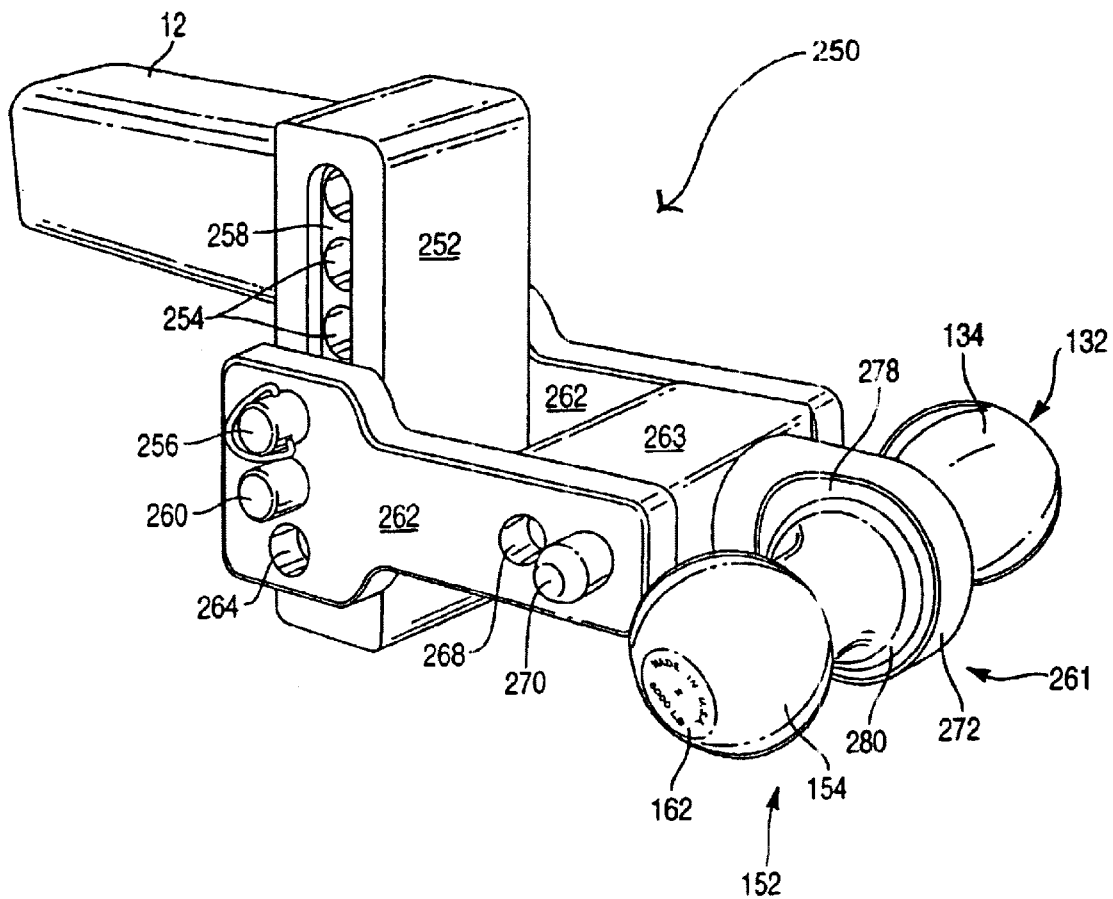
FIG. 23 is a perspective view of a deployed configuration of one alternative embodiment of an apparatus relying on a pin or stud sliding in a slot to capture a pivoting mount, while a colinear row of pin apertures provide both height adjustment and stowage of a double-pivoting, two-axis, tow-hitch assembly.

Referring to FIG. 23, while referring generally to FIGS. 19–25, one embodiment of a system 250 in accordance with the invention may provide a much more readily adjustable and theft resistant configuration. A system 250 or hitch mount 250 may be secured to a receiver or other suitable adapter of a towing vehicle. The apparatus 250 may include a trunnion 12 adapted to slidably fit within a receiver or other suitable adapter in a comparatively snug, supported, locked position. In general, a pin aperture (not shown) or simply an aperture through the trunnion 12 may receive a pin for locking the trunnion 12 with respect to a receiver. The receiver is, however, optional. In fact, a system 250 may be connected to a vehicle via any suitable adapter or structural member of a vehicle.

In the illustrated embodiment, a system 250 may include a block 252 that is perforated by several apertures 254 having substantially equal diameters. The apertures 254 typically form a row of apertures 254 that extend in a transverse direction 18 along the longitudinal extent of the block 252. The apertures 254 are configured to receive a pin 256, which may function as a locking pin 256. The block 252 also includes slots 258 extending in a transverse direction 18 along opposing faces of the block 252 in substantial alignment with the row of apertures 254. The slots 258 typically extend in a longitudinal direction 14 a distance substantially equal to the diameter of the apertures 254 and in a lateral direction 16 a distance sufficient to enable slidable engagement of the slots 258 with pivot pins 260.

In the depicted embodiment, the pivot pins 260 extend through the beams 262 and into the slots 258 but do not enter the apertures 254. Typically, the pivot pins 260 are rigidly fastened or attached to the beams 262, which permits the pivot pins 260 to slidably engage the slots 258. Thus, as the pivot pins 260 move along the slots 258, the beams 262 move freely along the slots 258 in a substantially transverse direction 18. The beams 262 may be locked into a fixed position with respect to the slots 258, in the depicted embodiment, by placing a locking pin 256 through the apertures 254 and apertures 264.

Referring now to FIGS. 21–22, in certain embodiments, a platform 263 may be rigid or rotatable within the beams 262. In one embodiment, the platform 263 may be rigidly secured by an appropriate fastener, such as by welding, to the beams 262, making an integral mount 261. The mount 261 pivots around the pivot pins 260 between a deployed position and a stowed position. Thus, the beams 262 may pivot between a deployed position and a stowed position. The mount 261 pivots around the pivot pins 260 in a manner substantially similar to the mount 30 as described in connection with FIGS. 19–20.

Figure 24:
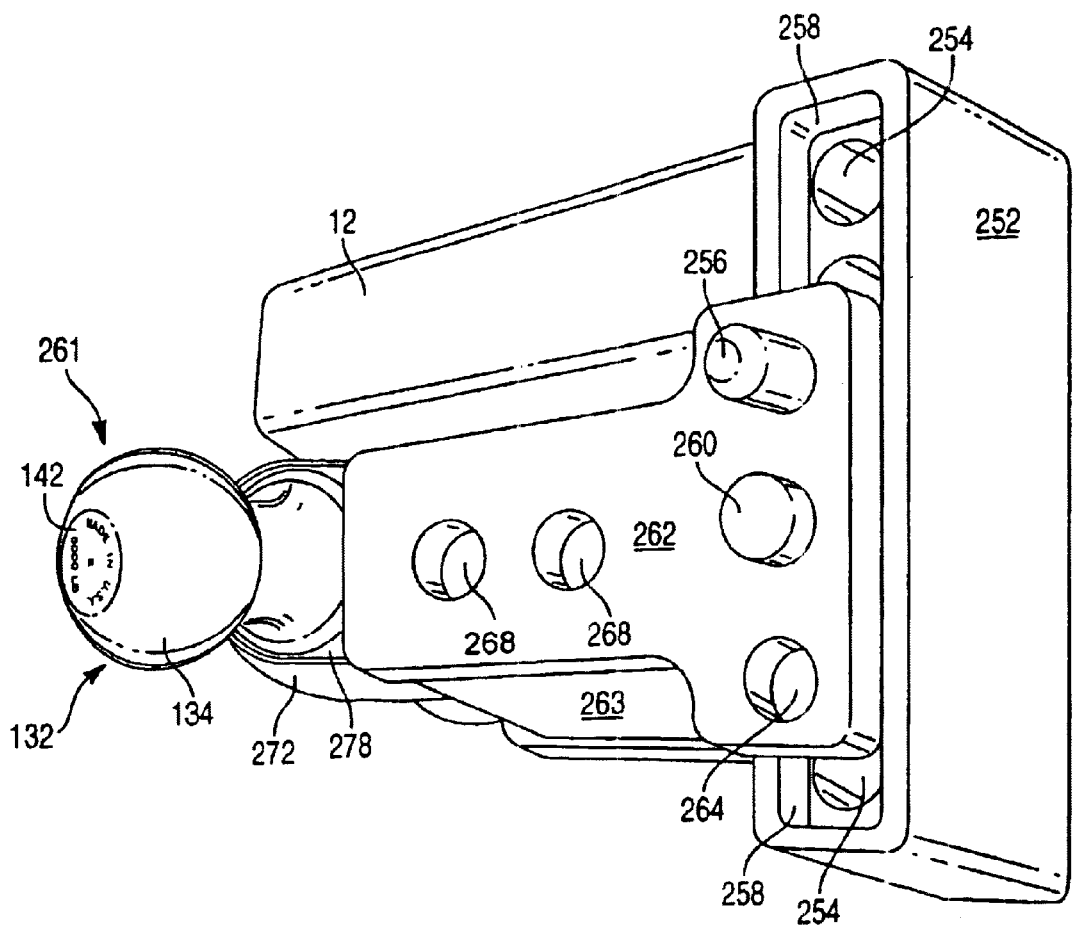
FIG. 24 is a perspective view of the apparatus of FIG. 23 in a stowed configuration.
Figure 25:
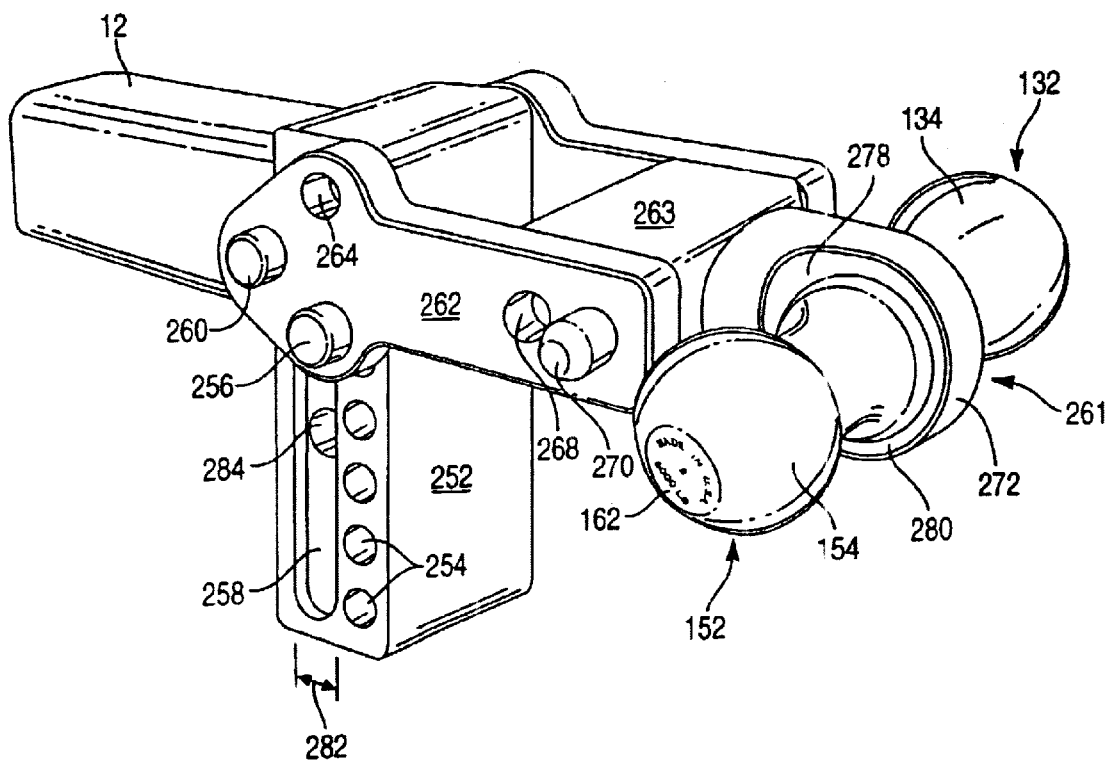
FIG. 25 is a perspective view of an alternative embodiment of a hitch system having studs in slots parallel to a row of pin apertures for height adjustment and stowage.

Moreover, the beams 262 may have additional apertures 266, 268 for receiving a pin 270 configured to selectively lock a turntable 272. In the example of FIGS. 23–25, the turntable 272 is secured to rotate about a longitudinal axis 14 in a circumferential direction 20, supported by a pin 274 extending longitudinally 14 through the platform 263. A suitable system of linchpins 52, or other keepers 54 may secure the pins 274 in the platform 263.

As a result of the rotational degree of freedom added by the turntable 272, the ball hitches 132, 152 may be secured to rest against flats 278 formed in the turntable 272. The ball hitches 132, 152 may be secured by any suitable means, and may include a lock washer 280 for securement against unthreading due to vibration during travel.

Multiple apertures 266, 268 may not be necessary. However, in the illustrated embodiment, in order to improve the structural integrity of the pin 274, one aperture 268 serves to receive the pin 270 in a deployed position of the turntable 272, while a second aperture 266 serves to receive the pin 270 when the turntable 272 has been rotated to a stowable or stowed position. By maintaining multiple apertures 266, 268, which may be oriented in any suitable direction within the platform 263 (e.g. vertical, horizontal, etc.), the mass of the pin 274 is maintained, providing additional support for the towing load.

Thus, in the embodiments depicted in FIGS. 23–25, the ball hitches 132, 152 may be rotated a longitudinal axis 14 in a circumferential direction 20 among a first deployed position in which the ball hitch 152 is presented for engagement with a trailer, a second deployed position in which ball hitch 132 is presented for engagement with a trailer, and stowable position in which ball hitches 132, 152 are substantially aligned in the plane formed by the longitudinal direction 14 and the lateral direction 16. Once the ball hitches 132, 152 are placed in the stowable position, the beams 262 may be pivoted between the deployed position (see FIG. 23) and the stowed position (see FIG. 24).

A system 250 may alternatively be configured with a single ball hitch 34 or a conventional ball hitch 34. The hitch 34 may be connected to the platform 263 of a mount 261. The hitch 34 of the embodiments depicted may be substantially similar in all material respects to the hitch 34 described in connection with FIGS. 1 and 2. In certain embodiments, the configuration of a single ball hitch 34 permits the beams 262 to be pivoted between a deployed position and a stowed position without removal or adjustment of the single ball hitch 34.

Once the beams 262 and the ball hitches 132, 152 are placed in the stowed position, the system 250 fits substantially within the envelope of the vehicle to which the system 250 is attached.

The beams 262 may take various positions, with various of the apertures 254 serving to receive one or more locking pins 256. In certain embodiments, more than two. apertures 264 in the beams 262 may provide additional options for pivoting, locking, and so forth.

Referring now to FIG. 25, an alternative embodiment of a system 250 may include a block 252 that is perforated by a row of several apertures 254 having substantially equal diameters and extending in a substantially transverse direction 18 along the longitudinal extent of the block 252. The apertures 254 are configured to receive a locking pin 256. The block 252 of the depicted embodiment also includes slots 258 extending in a substantially transverse direction 18 along opposing faces of the block. In the embodiment of FIG. 25, the slots 258 are preferably offset an arbitrarily selectable distance 282 from the row of apertures 254. Moreover, the slots 258 preferably run parallel to the row of apertures 254. The offsetting of the slots 258 from the row of apertures 254 serves to increase the section modulus of the block 252, which correspondingly increases the load strength and capacity of the block 252.

The block 252 may also include a locking aperture 284, which is preferably located in substantial alignment with the slots 258. The beams 262 and mount 261 may be pivoted into the stowed position and may be locked in the stowed position by passing a locking pin 256 through a beam aperture 264 and the locking aperture 284.

In substantially similar fashion to the embodiment of the system 250 depicted in FIGS. 23–24, the slots 258 are preferably in slidable engagement with pivot pins 260. The slots 258 of the embodiment of FIG. 25 may extend in a longitudinal direction 14 and in a lateral direction 16 a sufficient distance to accommodate pivot pins 260 of suitable size and strength.

In the depicted embodiment, the pivot pins 260 extend through and are rigidly connected to the beams 262. The pivot pins 260 also extend into the slots 258 such that the pivot pins 260 are in slidable engagement with the slots 258. Thus, the pivot pins 260 may move along the slots 258 in a substantially transverse direction 18 thereby moving the beams 262 in a substantially transverse direction 18. The beams 262 may be locked into a fixed position with respect to the slots 258, in the depicted embodiment, by placing a locking pin 256 through the apertures 254 and apertures 264.

The embodiment of the system 250 shown in FIG. 25 may include a mount 261 substantially as described in connection with the embodiments of FIGS. 23–24. The depicted embodiment may also alternatively employ double ball hitches 132, 152 or may employ a single ball hitch 34.

From the above discussion, it will be appreciated that the present invention provides a pivoting, underslung, stowaway hitch mount that is theft resistant, because the parts of the mount are permanently attached to one another, yet the invention may be compactly stowed out of the way. The present invention also provides for adjustment in two degrees of freedom without release from the receiver or the structural member of the vehicle to which the hitch mount is attached. The present invention further provides for adjustment with the aid of relatively few or no tools.

It will also be appreciated that the present invention provides a double ball system that supports the full rated load for each ball size, as if the ball were a conventional hitch ball. A pedestal provides a strong region for receiving a threaded stud from another ball, without compromising the neck supporting the ball itself. The double ball system may be installed on a conventional mount, providing a ready replacement of one size with another without any need for storage elsewhere. Alternatively, the double ball hitch may be secured to a stowaway mount, selected from several available in accordance with the invention. Profiles and clearances may be optimized by a combination of several pivoting members used selectively for stowage and deployment.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by U.S. Letters Patent is:

1. An apparatus for mounting a hitch to a vehicle, comprising:
    a base having a supporting portion to connect to a vehicle, and two lateral faces having a concealing surface extending substantially continuously therebetween;
    a first pivot engaging the base to pivot about a first axis;
    a mount having a main portion and a fastening portion, the main portion engaging the first pivot to provide a pivoting motion of the mount with respect to the base between a stowed position and a towing position, distinct from the stowed position, the concealing surface substantially concealing the fastening portion along a line of sight from a location substantially confronting the concealing surface when the mount is rotated about the first axis to position the mount under the supporting portion in the stowed position, and the fastening portion receiving a plurality of hitches thereon; and
    a second pivot connecting the main portion to the fastening portion to provide rotation of the fastening portion with respect to the main portion about a second axis.

2. The apparatus of claim 1, further comprising a first lock to selectively secure the mount with respect to the base in the stowed position and in the towing position.

3. The apparatus of claim 2, further comprising a second lock to selectively secure the fastening portion in a plurality of hitch positions with respect to the main portion.

4. The apparatus of claim 3, wherein the plurality of hitches is inaccessible for towing when the mount is in the stowed position.

5. The apparatus of claim 4, wherein the plurality of hitches comprises:
   a first ball hitch having a shank integrally and monolithically extending axially therefrom;
   a second ball hitch having a pedestal with an aperture formed therein, wherein
   the aperture is shaped and configured to axially secure the first ball hitch to the second ball hitch by receiving and engaging the shank.

6. The apparatus of claim 5, further comprising a slot defined in each lateral face.

7. The apparatus of claim 6, further comprising two studs apposingly secured to the main portion and positioned for each stud to slide within one of the slots.

8. The apparatus of claim 7, wherein the engagement of the first pivot with the base provides pivoting of the mount about the first axis and translation of the mount with respect to the base along a third axis.

9. The apparatus of claim 8, wherein the first pivot maintains the mount in continuous securement with the base during the pivoting of the mount about the first axis and during the translation of the mount along the third axis.

10. The apparatus of claim 1, wherein the plurality of hitches is inaccessible for towing when the mount is in the stowed position.

11. The apparatus of claim 1, wherein the plurality of hitches comprises:
    a first ball hitch having a shank monolithically extending axially therefrom;
    a second ball hitch having a pedestal with an aperture formed therein, wherein
    the aperture is shaped and configured to axially secure the first ball hitch to the second ball hitch by receiving and engaging the shank.

12. The apparatus of claim 11, wherein the fastening portion comprises a platform with an aperture defined therein, wherein the aperture defined in the platform is sized to receive the shank.

13. The apparatus of claim 1, wherein the engagement of the first pivot with the base provides pivoting of the mount about the first axis and translation of the mount with respect to the base along a third axis.

14. The apparatus of claim 1, wherein the first pivot maintains the mount in continuous securement with the base.

15. An apparatus for mounting a hitch to a vehicle, the apparatus comprising:
    a base having a supporting portion to connect to a vehicle, and two lateral faces having a substantially continuous concealing surface extending therebetween;
    a mount having a main portion and a fastening portion;
    the main portion pivotably secured to the base to provide a pitching motion of the mount with respect to the base between a stowed position and a towing position, distinct from the stowed position, the concealing surface substantially concealing the fastening portion along a line of sight from a location substantially confronting the concealing surface when the mount is rotated about the first axis to position the mount under the supporting portion in the stowed position;
    the fastening portion pivotably secured to the main portion to provide a rolling motion of the fastening portion with respect to the main portion; and
    a first hitch and second hitch secured to the fastening portion to extend away from one another.

16. The apparatus of claim 15, wherein the first and second hitch form a homogenously formed monolithic member.

* * * * *